(12) United States Patent
Noh et al.

(10) Patent No.: US 11,316,564 B2
(45) Date of Patent: Apr. 26, 2022

(54) METHOD AND APPARATUS FOR RESOURCE ALLOCATION AND PRECODING FOR UPLINK MOBILE COMMUNICATION SYSTEM

(71) Applicant: Samsung Electronics Co., Ltd., Gyeonggi-do (KR)

(72) Inventors: Hoondong Noh, Gyeonggi-do (KR); Youngwoo Kwak, Gyeonggi-do (KR); Younsun Kim, Gyeonggi-do (KR); Juho Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 211 days.

(21) Appl. No.: 16/607,548

(22) PCT Filed: Apr. 19, 2018

(86) PCT No.: PCT/KR2018/004545
§ 371 (c)(1),
(2) Date: Oct. 23, 2019

(87) PCT Pub. No.: WO2018/199551
PCT Pub. Date: Nov. 1, 2018

(65) Prior Publication Data
US 2020/0076484 A1 Mar. 5, 2020

(30) Foreign Application Priority Data
Apr. 25, 2017 (KR) .................. 10-2017-0052776

(51) Int. Cl.
*H04B 7/0456* (2017.01)
*H04B 7/06* (2006.01)
(Continued)

(52) U.S. Cl.
CPC ......... *H04B 7/0456* (2013.01); *H04B 7/0617* (2013.01); *H04L 5/0092* (2013.01); *H04W 72/042* (2013.01); *H04W 72/0453* (2013.01)

(58) Field of Classification Search
CPC ............. H04L 5/001; H04L 5/0092; H04W 72/0453; H04W 72/042; H04B 7/0617; H04B 7/0456; H04B 7/0404
See application file for complete search history.

(56) References Cited

U.S. PATENT DOCUMENTS

2012/0314678 A1* 12/2012 Ko .................. H04W 72/10
370/329
2015/0055576 A1 2/2015 Zhang et al.
(Continued)

FOREIGN PATENT DOCUMENTS

KR 1020180022071 3/2018
KR 1020180119265 11/2018
(Continued)

OTHER PUBLICATIONS

3GPP, 3rd Generation Partnership Project; Technical Specification Group Radio Access Network; NR; Multiplexing and Channel Coding (Release 15), 3GPP TS 38.212 V15.7.0, Sep. 2019, 101 Pages.
(Continued)

*Primary Examiner* — Anez C Ebrahim
(74) *Attorney, Agent, or Firm* — The Farrell Law Firm, P.C.

(57) ABSTRACT

The present disclosure relates to a communication technique that fuses a 5G communication system for supporting a higher data transmission rate than a 4G system with IoT technology, and a system therefor. The present disclosure may be applied to an intelligent service (for example, smart home, a smart building, a smart city, a smart car or connected car, health care, digital education retail, a security and
(Continued)

safety related service, etc.) on the basis of 5G communication technology and IoT related technology. The present invention provides a resource allocation and PRB bundling method suitable for uplink sub-band precoding such that the uplink sub-band precoding is efficiently performed without a large increase in an uplink related downlink control information payload.

12 Claims, 14 Drawing Sheets

(51) Int. Cl.
*H04L 5/00* (2006.01)
*H04W 72/04* (2009.01)

(56) References Cited

U.S. PATENT DOCUMENTS

| | | | |
|---|---|---|---|
| 2015/0326290 A1* | 11/2015 | Harrison | H04B 7/0456 375/260 |
| 2016/0227520 A1 | 8/2016 | Davydov et al. | |
| 2018/0131481 A1 | 5/2018 | Jiang et al. | |
| 2019/0199417 A1 | 6/2019 | Noh et al. | |
| 2020/0076484 A1 | 3/2020 | Noh et al. | |

FOREIGN PATENT DOCUMENTS

| | | |
|---|---|---|
| WO | WO 2018/128297 | 7/2018 |
| WO | WO 2018/231127 | 12/2018 |

OTHER PUBLICATIONS

3GPP, 3rd Generation Partnership Project; Technical Specification Group Radio Access Network; NR; Physical Layer Procedures for Data (Release 16), 3GPP TS 38.214 V16.0.0, Dec. 2019, 147 Pages.

Qualcomm Incorporated et al., Joint Proposal on Length-12, Length-18 and Length-24 CG Sequences for pi/2 BPSK, R1-1901362, Jan. 22, 2019, 13 pages.

Huawei et al., "On Control Signaling for Duplexing Flexibility", R1-1700079, 3GPP TSG RAN WG1 NR Ad-Hoc Meeting, Jan. 16-20, 2017, 3 pages.

Qualcomm Incorporated, "Dynamic TD UE to UE Measurement Considerations", R1-1716449, 3GPP TSG RAN WG1 Meeting NR#3, Sep. 18-21, 2017, 4 pages.

International Search Report dated May 22, 2020 issued in counterpart application No. PCT/KR2020/002102, 13 pages.

PCT/ISA/210 Search Report issued on PCT/KR2018/004545, pp. 7.

PCT/ISA/237 Written Opinion issued on PCT/KR2018/004545, pp. 7.

Samsung, 3GPP TSG RAN WG1 Meeting #88bis, R1-1705339, Spokane, USA, Mar. 24, 2017, "PRB bundling for NR DMRS", pp. 6.

Qualcomm Incorporated, 3GPP TSG RAN WG1 #88bis, R1-1705580, Spokane, USA, Mar. 25, 2017, "Discussion on PRB bundling for DL", pp. 16.

Nokia, Alcatel-Lucent Shanghai Bell, 3GPP TSG RAN WG1#88bis, R1-1705958, Spokane, WA, USA, Mar. 24, 2017, "On details of PRB Bundling", pp. 4.

* cited by examiner

METHOD AND APPARATUS FOR RESOURCE ALLOCATION AND PRECODING FOR UPLINK MOBILE COMMUNICATION SYSTEM

PRIORITY

This application is a National Phase Entry of PCT International Application No. PCT/KR2018/004545 which was filed on Apr. 19, 2018, and claims priority to Korean Patent Application No. 10-2017-0052776, which was filed on Apr. 25, 2017, the content of each of which is incorporated herein by reference.

TECHNICAL FIELD

The disclosure relates to a mobile communication system, and more particularly to a signaling method for a multi-input multi-output (MIMO) system.

BACKGROUND ART

In order to meet wireless data traffic demands, which have increased since the commercialization of a 4G communication system, efforts to develop an improved 5G communication system or a pre-5G communication system have been made. For this reason, the 5G communication system or the pre-5G communication system is called a beyond-4G-network communication system or a post-LTE system. In order to achieve a high data transmission rate, implementation of the 5G communication system in an mmWave band (for example, a 60 GHz band) is being considered. In the 5G communication system, technologies such as beamforming, massive MIMO, Full-Dimensional MIMO (FD-MIMO), array antenna, analog beamforming, and large-scale antenna techniques are being discussed as means to mitigate a propagation path loss in the mmWave band and increase a propagation transmission distance. Further, in the 5G communication system, technologies such as an evolved small cell, an advanced small cell, a cloud Radio Access Network (RAN), an ultra-dense network, Device-to-Device communication (D2D), a wireless backhaul, a moving network, cooperative communication, Coordinated Multi-Points (CoMP), and received interference cancellation have been developed in order to improve the system network. In addition, the 5G system has developed Advanced Coding Modulation (ACM) schemes such as Hybrid FSK and QAM Modulation (FQAM) and Sliding Window Superposition Coding (SWSC), and advanced access technologies such as Filter Bank Multi-Carrier (FBMC), Non-Orthogonal Multiple Access (NOMA), and Sparse Code Multiple Access (SCMA).

Meanwhile, the Internet has evolved from a human-oriented connection network, in which humans generate and consume information, into the Internet of things (IoT), in which distributed components such as objects exchange and process information. Internet-of-Everything (IoE) technology, in which big-data processing technology involving a connection with a cloud server or the like is combined with IoT technology, has emerged. In order to implement IoT, technical factors such as a sensing technique, wired/wireless communication, network infrastructure, service-interface technology, and security technology are required, and research on technologies such as a sensor network, Machine-to-Machine (M2M) communication, Machine-Type Communication (MTC), and the like for connection between objects has recently been conducted. In an IoT environment, through collection and analysis of data generated in connected objects, an intelligent Internet technology (IT) service to create new value in peoples' lives may be provided. The IoT may be applied to fields such as those of a smart home, smart building, smart city, smart car, connected car, smart grid, healthcare service, smart home appliance, or high-tech medical service, through the convergence of conventional Information technology (IT) with various industries.

Accordingly, various attempts to apply 5G communication system to the IoT network are being made. For example, technologies such as a sensor network, machine-to-machine (M2M), and machine-type communication (MTC) are implemented by beamforming, MIMO, and array antenna schemes. The application of a cloud RAN as big-data processing technology may be an example of convergence of 5G technology and IoT technology.

In wireless communication systems such as LTE and LTE-A, a base station estimates an uplink channel through a reference signal such as a sounding reference signal (SRS), determines precoding information and a modulation and coding scheme (MCS) to be used by a terminal, and informs the terminal thereof. The terminal receives the precoding information and MCS information through uplink (UL) downlink control information (DCI) and performs uplink transmission according thereto. At this time, the capacity of the UL DCI is limited due to the requirement to secure sufficient coverage, and excessive information cannot be transmitted. Accordingly, the current wireless communication system supports only wideband precoding through single precoding information notification.

DISCLOSURE OF INVENTION

Technical Problem

Meanwhile, wideband precoding has lower precoding accuracy compared to subband precoding and thus it is required to support subband precoding even in uplink. The base station may inform the terminal of subband-specific uplink precoding information and is required to efficiently and appropriately apply subband-specific uplink precoding information to allocated uplink resources and efficiently transmit the subband-specific uplink precoding information. Accordingly, the disclosure proposes uplink resource allocation and PRB bundling methods that take into consideration the subband precoding through detailed embodiments.

Solution to Problem

In accordance with an aspect of the disclosure, a method of receiving an uplink signal by a base station (BS) in a communication system is provided. The method includes: generating Downlink Control Information (DCI) including at least one piece of uplink precoding information; transmitting the DCI to a terminal; and receiving an uplink signal generated based on the at least one piece of uplink precoding information, wherein the at least one piece of uplink precoding information is applied to resources having a predetermined size which are portions of resources through which the uplink signal is transmitted. The resources having the predetermined size may be determined based on a size of a resource block group (RBG), and a maximum number of pieces of the uplink precoding information included in the DCI may be determined based on a size of bandwidth parts. If the number of at least one piece of the uplink precoding information included in the DCI is smaller than a maximum number of pieces of the uplink precoding information, the DCI may include a number of predetermined bits corresponding to a number generated by subtracting the number of at least one piece of uplink precoding information from the maximum number of pieces of the uplink precoding information.

In accordance with another aspect of the disclosure, a method of transmitting an uplink signal by a terminal in a communication system is provided. The method includes: receiving downlink control information (DCI) including at least one piece of uplink precoding information from a base station (BS); and transmitting an uplink signal generated based on the at least one piece of uplink precoding information, wherein the at least one piece of uplink precoding information is applied to resources having a predetermined size, which are portions of resources through which the uplink signal is transmitted.

In accordance with another aspect of the disclosure, a base station (BS) receiving an uplink signal in a communication system is provided. The base station includes: a transceiver; and a controller configured to perform control to generate downlink control information (DCI) including at least one piece of uplink precoding information, transmit the DCI to a terminal, receive an uplink signal generated based on the at least one piece of uplink precoding information, and connected to the transceiver, wherein the at least one piece of uplink precoding information is applied to resources having a predetermined size, which are portions of resources through which the uplink signal is transmitted.

In accordance with another aspect of the disclosure, a terminal transmitting an uplink signal in a communication system is provided. The terminal includes: a transceiver; and a controller configured to perform control to receive downlink control information (DCI) including at least one piece of uplink precoding information from a base station (BS) and transmit an uplink signal generated based on the at least one piece of uplink precoding information, and connected to the transceiver, wherein the at least one piece of uplink precoding information is applied to resources having a predetermined size, which are portions of resources through which the uplink signal is transmitted.

Advantageous Effects of Invention

According to an embodiment of the disclosure, resource allocation and physical resource block bundling methods suitable for uplink subband precoding can be provided, and thus uplink subband precoding can be performed without a large increase in an uplink-related downlink control information (DCI) payload.

MODE FOR THE INVENTION

Figure 1:
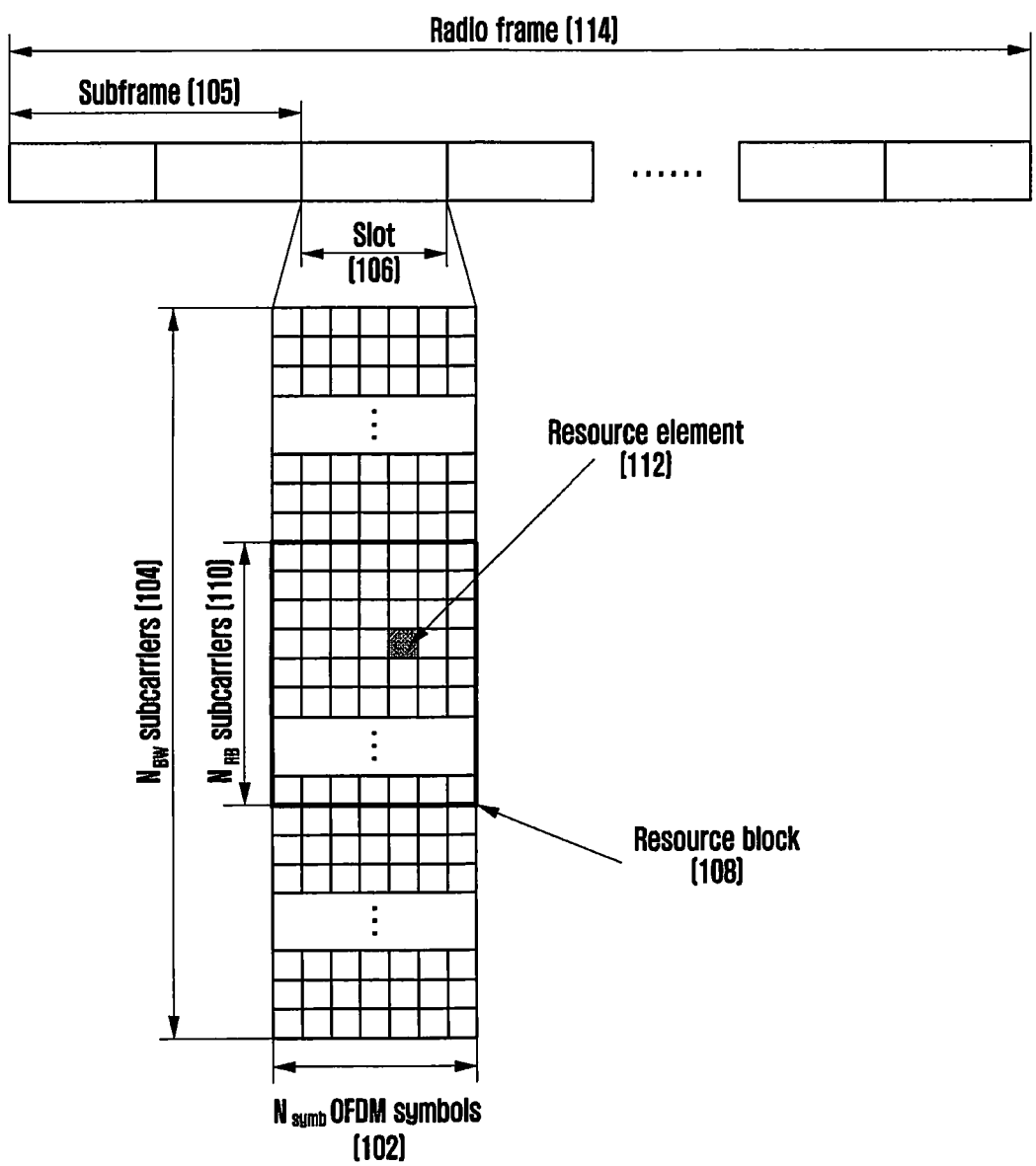
FIG. 1 illustrates the structure of transmission in downlink time-frequency regions in an LTE or LTE-A system.

Hereinafter, exemplary embodiments of the disclosure will be described in detail with reference to the accompanying drawings. Here, it is noted that identical reference numerals denote the same structural elements in the accompanying drawings. Further, a detailed description of a known function and configuration which may make the subject matter of the disclosure unclear will be omitted.

Further, in the detailed description of embodiments of the disclosure, an Advanced E-UTRA (or referred to also as LTE-A) system supporting a cooperative communication (CoMP) is mainly discussed. However, the main idea of the disclosure is applicable to other communication systems having similar technical backgrounds or channel types through a small modification without departing from the scope of the disclosure, which can be made by one skilled in the art. For example, the main subject of the disclosure can be applied to multicarrier HSPA that supports carrier aggregation.

In describing the exemplary embodiments of the disclosure, descriptions related to technical contents which are well-known in the art to which the disclosure pertains, and are not directly associated with the disclosure, will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more CPUs within a device or a security multimedia card.

A wireless communication system has developed into a broadband wireless communication system that provides a high-speed and high-quality packet data service, like the communication standards, for example, high-speed packet access (HSPA) of 3GPP, long-term evolution (LTE) or evolved universal terrestrial radio access (E-UTRA), LTE-advanced (LTE-A), high-rate packet data (HRPD) of 3GPP2, ultra-mobile broadband (UMB), and 802.16e of IEEE, or the like, beyond the initially provided voice-based service. Also, a communication standard of 5G or new radio (NR) is being developed as a $5^{th}$-generation wireless communication system.

An LTE system, which is a representative example of the broadband wireless communication system, employs an orthogonal frequency-division multiplexing (OFDM) scheme for a downlink (DL), and employs a single carrier frequency-division multiple access (SC-FDMA) scheme for an uplink (UL). The uplink is a radio link through which a terminal (a user equipment (UE) or a mobile station (MS)) transmits data or a control signal to a base station (BS or an eNode B (eNB)), and the downlink is a radio link through which the base station transmits data or a control signal to the terminal. In such a multi-access scheme, time-frequency resources for carrying data or control information are allocated and operated in a manner that prevents overlapping of resources, that is, that establishes orthogonality, between users so as to identify data or control information of each user. Hereinafter, the LTE system may include LTE and LTE-A systems.

When decoding fails upon initial transmission, the LTE system employs a hybrid automatic repeat request (HARQ) of retransmitting the corresponding data in a physical layer. In the HARQ scheme, when a receiver does not accurately decode data, the receiver transmits information (negative acknowledgement: NACK) informing a transmitter of a decoding failure, and thus the transmitter may re-transmit the corresponding data on the physical layer. The receiver combines the data re-transmitted by the transmitter with the data for which decoding previously failed, thereby increasing the data reception performance. When the receiver accurately decodes data, the receiver transmits information (acknowledgement: ACK) reporting that decoding was successful, so that the transmitter may transmit new data.

FIG. 1 illustrates the basic structure of a time-frequency region, which is a radio resource region in which a data or control channel is transmitted in downlink of the LTE system.

In FIG. 1, the horizontal axis indicates a time region and the vertical axis indicates a frequency region. A minimum transmission unit in the time region is an OFDM symbol. One slot 102 consists of $N_{symb}$ OFDM symbols 106 and one subframe 105 consists of 2 slots. The length of the slot is 0.5 ms, and the length of the subframe is 1.0 ms. A radio frame 114 is a time region interval consisting of 10 subframes. A minimum transmission unit in the frequency region is a subcarrier, and the bandwidth of an entire system transmission band consists of a total of $N_{BW}$ subcarriers 104.

A basic unit of resources in the time-frequency region is a resource element (RE) 112, and may be indicated by an OFDM symbol index and a subcarrier index. A resource block (RB or physical resource block (PRB)) 108 is defined by $N_{symb}$ successive OFDM symbols 102 in the time region and $N_{RB}$ successive subcarriers 110 in the frequency region. Accordingly, one RB 108 consists of $N_{symb} \times N_{RB}$ REs 112. In general, the minimum transmission unit of data is the RB unit. In the LTE system, in general, $N_{symb}=7$ and $N_{RB}=12$. $N_{BW}$ is proportional to a system transmission bandwidth. The data rate increases in proportion to the number of RBs scheduled for the terminal.

The LTE system defines and operates 6 transmission bandwidths. In the case of a frequency-division duplex (FDD) system, which operates a downlink and an uplink separated based on frequency, the downlink transmission bandwidth and the uplink transmission bandwidth may be different from each other. A channel bandwidth indicates an RF bandwidth corresponding to a system transmission bandwidth. [Table 1] indicates the relationship between a system transmission bandwidth and a channel bandwidth defined in the LTE system. For example, when an LTE system has a channel bandwidth of 10 MHz, the transmission bandwidth consists of 50 RBs.

TABLE 1

| | Channel bandwidth $BW_{Channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

Downlink control information is transmitted within the first N OFDM symbols in the subframe. Generally, N={1, 2, 3}. Accordingly, N varies in every subframe depending on the amount of control information that should be transmitted in the current subframe. The control information includes a control channel transmission interval indicator indicating how many OFDM symbols are used for transmitting the control information, scheduling information of downlink data or uplink data, and HARQ ACK/NACK signals.

In the LTE system, the scheduling information of downlink data or uplink data is transmitted from the base station to the terminal through downlink control information (DCI). The DCI is defined in various formats. The determined DCI format is applied and operated according to whether the DCI is scheduling information (UL grant) for uplink data or scheduling information (DL grant) for downlink data, whether the DCI is compact DCI containing a small amount of control information, whether the DCI applies spatial multiplexing using multiple antennas, and whether the DCI is DCI for controlling power. For example, DCI format 1, corresponding to scheduling control information of downlink data (DL grant), may be configured to include at least the following control information Resource allocation type 0/1 flag: notifies whether a resource allocation type is type 0 or type 1. Type 0 applies a bitmap scheme and allocates resources in units of resource block groups (RBGs). In the LTE system, the basic scheduling unit is a resource block (RB) indicated by time and frequency domain resources, and an RBG includes a plurality of RBs and is used as a basic scheduling unit in the type 0 scheme. Type 1 allows allocation of a predetermined RB in an RBG.

Resource block assignment: provides notification of RBs allocated to data transmission. Expressed resources are determined according to the system bandwidth and the resource allocation type.

Modulation and coding scheme (MCS): indicates the modulation scheme used for data transmission and the size of a transport block (TB), which is data to be transmitted.

HARQ process number: provides notification of a process number of HARQ.

New data indicator: indicates whether data is transmitted by HARQ initial transmission or retransmission.

Redundancy version: indicates the redundancy version of HARQ.

Transmit power control (TPC) command for physical uplink control channel (PUCCH): indicates a transmission power control command for a PUCCH, which is an uplink control channel.

The DCI is transmitted through a physical downlink control channel (PDCCH) or an enhanced PDCCH (EPDCCH) via a channel-coding and modulation process. Hereinafter, PDCCH or EPDCCH transmission may be interchangeable with DCI transmission through the PDCCH or the EPDCCH. The description may also be applied to other channels.

In general, the DCI is scrambled with a particular radio network temporary identifier (RNTI) (or a terminal identifier), independently for each terminal, a cyclic redundancy check (CRC) bit is added thereto, and then channel coding is performed, whereby each independent PDCCH is configured and transmitted. In the time region, the PDCCH is mapped and transmitted during the control channel transmission interval. The mapping location of the PDCCH in the frequency region is determined by an identifier (ID) of each terminal and is distributed to the entire system transmission band.

Downlink data is transmitted through a physical downlink shared channel (PDSCH), which is a physical channel for transmitting downlink data. The PDSCH is transmitted after the control channel transmission interval. Scheduling information, such as a specific mapping position in the frequency region and a modulation scheme, may be reported by DCI transmitted through the PDCCH.

Via an MCS formed of 5 bits in the control information included in the DCI, the base station may report the modulation scheme applied to a PDSCH to be transmitted to the terminal and the size (transport block size (TBS)) of data to be transmitted. The TBS corresponds to the size before channel coding for error correction is applied to the data (TB) to be transmitted by the base station.

The modulation schemes supported by the LTE system include quadrature phase shift keying (QPSK), 16 quadrature amplitude modulation (16QAM), and 64QAM, and the modulation orders (Qm) thereof correspond to 2, 4, and 6, respectively. That is, in the case of QPSK modulation, 2 bits may be transmitted per symbol. In the case of 16QAM modulation, 4 bits may be transmitted per symbol. In the case of 64QAM modulation, 6 bits may be transmitted per symbol.

Figure 2:
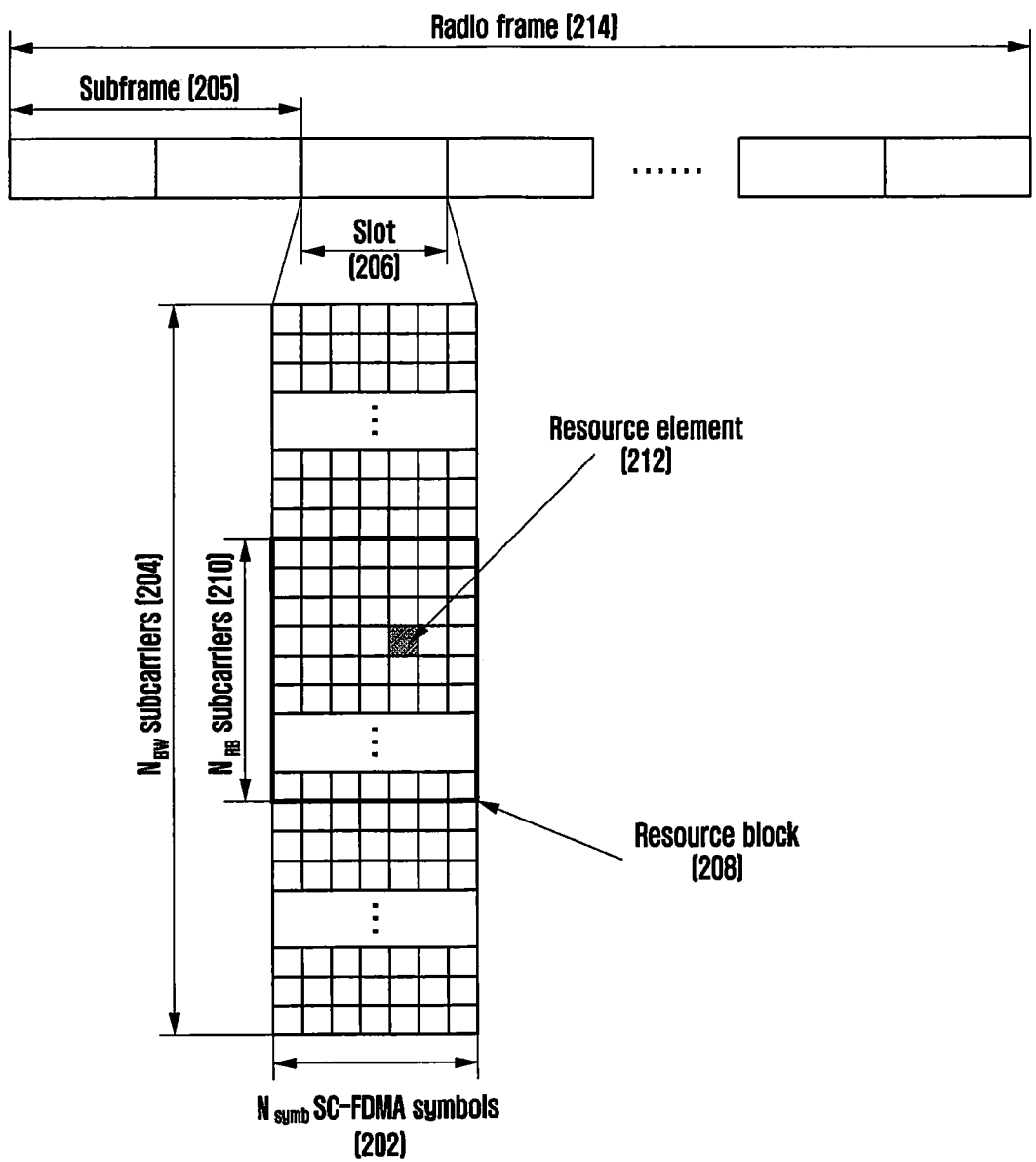
FIG. 2 illustrates the structure of transmission in uplink time-frequency regions in an LTE or LTE-A system.

FIG. 2 illustrates the basic structure of a time-frequency region, which is a radio resource region in which a data or control channel is transmitted in uplink of the LTE system.

Referring to FIG. 2, the horizontal axis indicates the time region and the vertical axis indicates the frequency region. A minimum transmission unit in the time region is an SC-FDMA system 202, and one slot 206 consists of $N_{symb}$ SC-FDMA symbols. One subframe 205 consists of two slots. A minimum transmission unit in the frequency region is a subcarrier, and an entire system transmission band (transmission bandwidth) 204 consists of a total of $N_{BW}$ subcarriers. $N_{BW}$ has a value proportional to a system transmission bandwidth.

The basic unit of resources in the time-frequency region is a resource element (RE) 212, and may be defined by an SC-FDMA symbol index and a subcarrier index. A resource block (RB) 208 is defined by $N_{symb}$ successive SC-FDMA symbols in the time region and $N_{BW}$ successive subcarriers in the frequency region. Accordingly, one RB consists of $N_{symb} \times N_{RB}$ REs. In general, the minimum transmission unit of data or control information is an RB. A PUCCH is mapped to the frequency region corresponding to 1 RB and transmitted during one subframe.

The timing relationship between a PDSCH, which is a physical channel for transmitting downlink data, or a PDCCH or an EPDCCH including semi-persistent scheduling release (or SPS release), and a PUCCH or a PUSCH, which is an uplink physical channel for transmitting HARQ ACK/NACK, is defined in the LTE system. For example, in the LTE system operating in an FDD manner, HARQ ACK/NACK corresponding to a PDSCH transmitted in an (n−4)$^{th}$ subframe or a PDCCH or an EPDCCH including SRS release is transmitted to a PUCCH or a PUSCH in an n$^{th}$ subframe.

In the LTE system, a downlink HARQ adopts an asynchronous HARQ scheme in which a data retransmission time point is not fixed. That is, when the base station receives a HARQ NACK feedback of initially transmitted data, which the base station transmits, from the terminal, the base station freely determines the time point at which retransmitted data is transmitted via a scheduling operation. For the HARQ operation, the terminal buffers data which is determined to be erroneous on the basis of the result of decoding of the received data and then combines the data with subsequently retransmitted data.

When the terminal receives a PDSCH including downlink data transmitted from the base station through subframe n, the terminal transmits uplink control information including HARQ ACK or NACK of the downlink data to the base station through a PUCCH or a PUSCH in subframe n+k. In this instance, k is defined differently according to whether the LTE system uses FDD or time-division duplexing (TDD) and the subframe configuration thereof. For example, in the case of an FDD LTE system, k is fixed to 4. Meanwhile, in the case of a TDD LTE system, k may vary depending on the subframe configuration and the subframe number.

In the LTE system, unlike downlink HARQ, uplink HARQ adopts a synchronous HARQ scheme in which a data transmission time point is fixed. That is, the uplink/downlink timing relationship between a physical uplink shared channel (PUSCH), which is a physical channel for uplink data transmission, a PDCCH, which is a preceding downlink control channel, and a physical hybrid indicator channel (PHICH), which is a physical channel for transmitting downlink HARQ ACK/NACK corresponding to uplink data on the PUSCH, is fixed by the following rule.

When the terminal receives a PDCCH including uplink scheduling control information transmitted from the base station or a PHICH for transmitting downlink HARQ ACK/NACK through subframe n, the terminal transmits uplink data corresponding to the control information through a PUSCH in subframe n+k. At this time, k is defined differently depending on whether the LTE system uses FDD or TDD the configuration thereof. For example, in the case of the FDD LTE system, k is fixed to 4. Meanwhile, in the case of the TDD LTE system, k may vary depending on the subframe configuration and the subframe number.

Further, when the terminal receives a PHICH carrying a downlink HARQ ACK/NACK from the terminal in subframe i, the PHICH corresponds to a PUSCH transmitted by the terminal in subframe (i-k). In this instance, k is defined differently depending on whether FDD or TDD is used in the LTE system and on the configuration thereof. For example, in the case of a FDD LTE system, k is fixed to 4. Meanwhile, in the case of a TDD LTE system, k may vary depending on a subframe configuration and a subframe number.

The description of the wireless communication system has been made on the basis of the LTE system, but the disclosure is not limited to the LTE system, and may be applied to various wireless communication systems such as NR and 5G.

Figure 3:
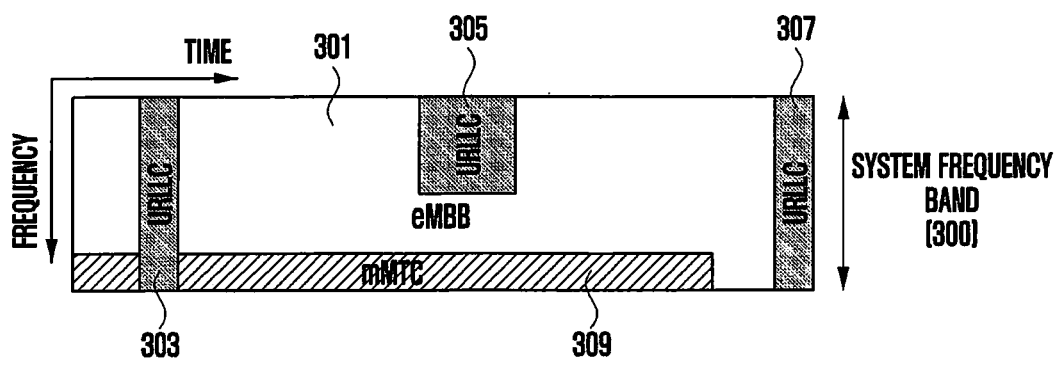
FIG. 3 illustrates an example in which various verticals (or slices) are transmitted in time-frequency regions such as eMBB, URLLC, and mMTC.
Figure 4:
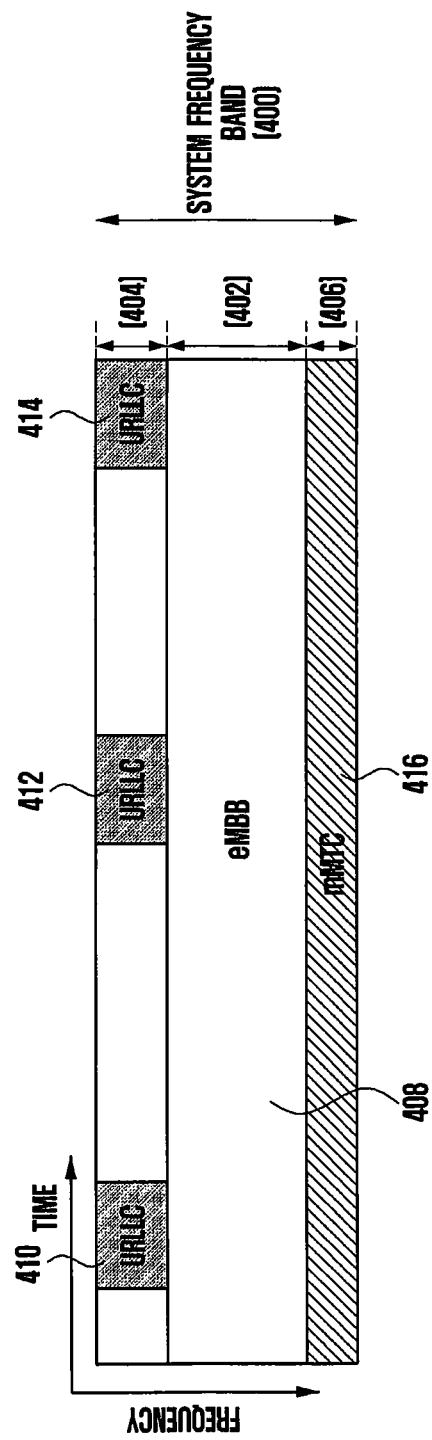
FIG. 4 illustrates another example in which various verticals (or slices) are transmitted in time-frequency regions such as eMBB, URLLC, and mMTC.

FIGS. 3 and 4 illustrate examples in which data for enhanced mobile broadband (eMBB), ultra-reliable and low-latency communications (URLLC), and massive machine-type communication (mMTC), which are services under consideration for implementation in the 5G or NR system, is allocated to frequency-time resources.

In FIG. 3, eMBB, URLLC, and mMTC data are allocated to the entire system frequency band 300. When URLLC data 303, 305, and 307 are generated while eMBB data 301 and mMTC data 309 are allocated to a specific frequency band and transmitted, and thus transmission thereof is needed, the transmitter may empty parts of the resources to which the eMBB data 301 and the mMTC data 309 have already been allocated and transmit the URLLC data 303, 305, and 307. Particularly, a short delay time is important to the URLLC, among the services, so that the URLLC data 303, 305, and 307 may be transmitted while being allocated to parts of the resources 301 to which the eMBB is allocated. Of course, when the URLLC is additionally allocated and transmitted in resources to which the eMBB is allocated, eMBB data may not be transmitted in duplicate frequency-time resources, and accordingly, the performance of eMBB data transmission may be reduced. That is, in the above case, eMBB data transmission may fail due to URLLC allocation.

In FIG. 4, an entire system frequency band 400 may be divided into subbands 402, 404, and 406 and used for transmitting services and data. The subbands may be divided in advance, and information thereof may be transmitted to the terminal through higher signaling, or the base station may randomly divide the subbands and provide services to the terminal without any information on the subbands. FIG. 4 illustrates an example in which a subband 402 is used for eMBB data transmission 408, a subband 404 is used for URLLC data transmission 410, 412, and 414, and a subband 406 is used for mMTC data transmission 416. In FIGS. 3 and 4; the length of a transmission time interval (TTI) used for URLLC transmission may be shorter than the length of a TTI used for eMBB or mMTC transmission.

Hereinafter, an embodiment of the disclosure will be described in detail with reference to the accompanying drawings. In the following description of the disclosure, a detailed description of known functions or configurations incorporated herein will be omitted when the same may make the subject matter of the disclosure rather unclear. The terms which will be described below are terms defined in consideration of the functions in the disclosure, and may be different according to users, intentions of the users, or customs. Therefore, the definitions of the terms should be made based on the content throughout the specification.

Hereinafter, the BS is the entity that allocates resources to the terminal, and may be at least one of an eNode B, a Node B, a base station (BS), a radio access unit, a base station controller, and a node on a network. The terminal may include a user equipment (UE), a mobile station (MS), a cellular phone, a smartphone, a computer, and a multimedia system capable of performing a communication function. Hereinafter, the embodiment of the disclosure is described on the basis of the LTE or LTE-A system by way of example, but the embodiment of the disclosure may be applied to other communication systems having a similar technical background or channel form. For example, 5$^{th}$-generation mobile communication technology (5G, new radio (NR)), developed after LTE-A, may be included therein. Further, the embodiment of the disclosure may be modified and may be applied to other communication systems through some modifications based on a determination by those skilled in the art without departing from the scope of the disclosure.

Particularly, the terms "physical channel" and "signal" in the conventional LTE or LTE-A system may be used to describe the method and the apparatus proposed by the disclosure. However, embodiments of the disclosure can be applied to a wireless communication system rather than the LTE and LTE-A systems. Further, the embodiment of the disclosure can be applied to FDD and TDD systems.

Hereinafter, in the disclosure, physical-layer signaling is a method of transmitting a signal from the base station to the terminal through a downlink control channel of a physical layer or from the terminal to the base station through an uplink control channel of a physical layer, and may be referred to as L1 signaling or PHY signaling.

In the disclosure, higher signaling or higher-layer signaling is a method of transmitting a signal from the base station to the terminal through a downlink data channel of a physical layer or from the terminal to the base station through an uplink data channel of a physical layer, and may be referred to as RRC signaling, L2 signaling, PDCP signaling, or a MAC control element (MAC CE).

In the disclosure, a TPMI indicates a transmit precoding matrix indicator or transmit precoding matrix information, and, similarly, may be expressed as beamforming vector information or beam direction information.

In the disclosure, uplink (UL) DCI or UL-related DCI is physical-layer control signaling (L1 control) including information required for uplink transmission, such as uplink resource configuration information and resource configuration type information, such as UL grant, uplink power control information, cyclic shift of an uplink reference signal, an orthogonal cover code (OCC), a channel state information (CSI) request, a sounding reference signal (SRS) request, MCS information for each codeword, and an uplink precoding information field.

Wideband precoding currently applied to the uplink has low accuracy compared to subband precoding, and the difference in uplink transmission efficiency between the wideband precoding and the subband precoding increases in proportion to the number of transmission antennas of the terminal. Unlike the current wireless communication system, which assumes a maximum of four terminal transmission antennas, an antenna form factor is improved due to carriers of a high frequency, and RF technique is developed in the future 5G (new radio (NR)) wireless communication system, so that the terminal is highly likely to use four or more transmission antennas.

Accordingly, in the NR wireless communication system, demands of supporting subband precoding in the uplink increase. To this end, the base station may notify the terminal of subband-specific uplink precoding information (a transmission precoding matrix indicator (TPMI)) through a control channel (physical downlink control channel (PDCCH or nr-PDCCH)). Meanwhile, in this case, uplink-related DCI payload required for TPMI transmission may exponentially increase according to the number of subbands to which subband precoding is applied. In order to solve the problem, it is important to appropriately apply the limited number of TPMIs to allocated uplink resources.

Hereinafter, the disclosure proposes a precoding information signaling method for uplink transmission in the MIMO system. In uplink transmission, precoding information should be determined by the base station, which is the reception side of uplink transmission and provided to the terminal. However, when precoding is applied differently to each subband, the precoding information may place an excessive burden on control channel capacity. Accordingly, the number of pieces of precoding information indicated by the base station should be limited, and it is required to consider uplink resource condition and physical resource block bundling (PRB bundling) in order to apply a limited number of kinds of subband precoding. The disclosure proposes an uplink resource block group (RBG) configuration method and a PRB bundling method for subband precoding.

Hereinafter, it is assumed that dynamic beamforming or semi-dynamic beamforming is supported in order to perform uplink transmission in various scenarios of the disclosure.

Figure 5:
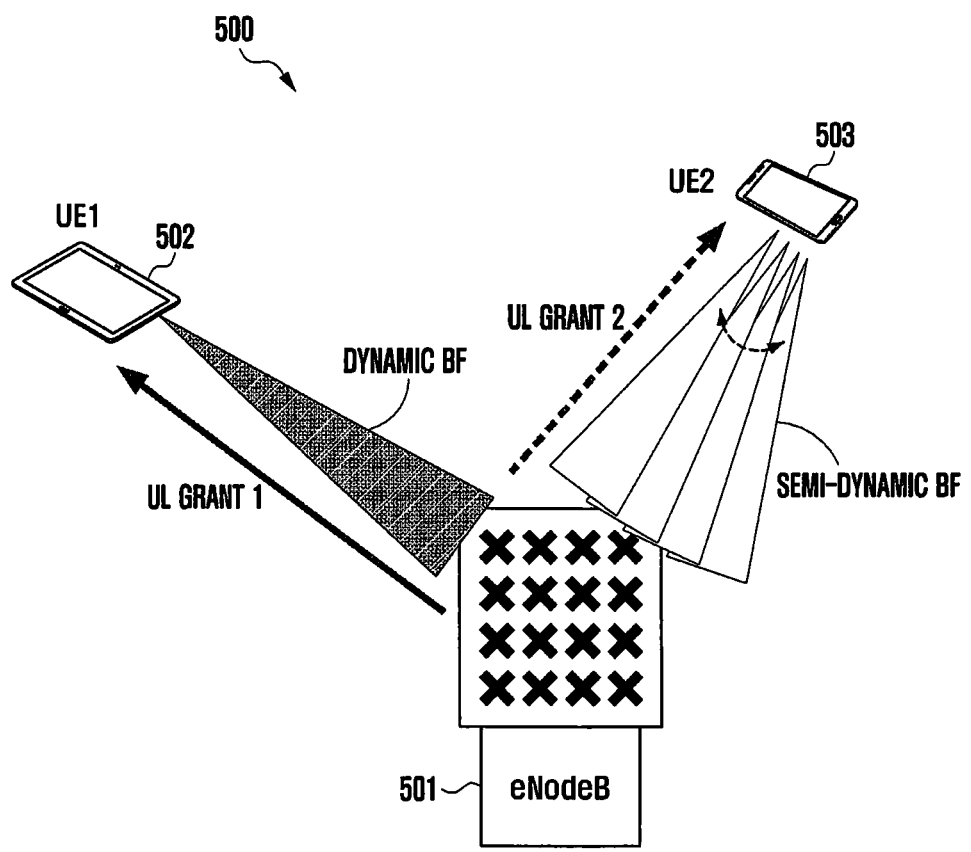
FIG. 5 illustrates an example of uplink transmission according to dynamic beamforming or semi-dynamic beamforming in an NR system.

FIG. 5 illustrates an example of uplink transmission through dynamic beamforming or semi-dynamic beamforming.

Dynamic beamforming is suitable for the case in which the movement speed of the terminal is low, separation between cells is good, or accurate uplink channel information is available, as in the situation in which inter-cell interference management is good. In this case, a terminal 502 may perform uplink transmission using a beam having a narrow beam width on the basis of accurate uplink channel direction information. The base station 501 notifies the terminal of a TPMI through UL DCI such as UL grant. After receiving TPMI signaling, the terminal transmits uplink data to the base station through a precoder indicated by the TPMI or a beamforming vector (or matrix).

Multi-input multi-output (MIMO) transmission based on a codebook for supporting the dynamic beamforming may be operated by UL DCI including a precoding information (precoding matrix indicator (PMI)) field (determined according to a rank indicator (RI) when the corresponding RI exists). At this time, the precoding information field indicates a precoding matrix used for uplink transmission allocated to the corresponding terminal. The precoding matrix may be agreed to point to one direction in the allocated entire band in the case of wideband precoding information and to point to one direction for each subband in the case of subband precoding information. At this time, a precoding vector designated by the subband precoding information may be included in the precoding vector group designated by the wideband precoding information. Accordingly, the signaling burden for subband precoding information may be reduced.

The semi-dynamic beamforming is suitable for the case in which a movement speed of the terminal is high, separation between cells is not good, or uplink channel information is inaccurate, as in the situation in which inter-cell interference management is not good. In this case, the terminal 503 may perform uplink transmission using a beam group including beams in various directions on the basis of schematic uplink channel direction information. The base station 501 notifies the terminal of a TPMI through UL DCI such as a UL grant. After receiving TPMI signaling, the terminal transmits uplink data to the base station through a subset of the precoder indicated by the TPMI or a subset of the beamforming vector (or matrix).

MIMO transmission based on a codebook for supporting semi-dynamic beamforming may be operated by UL DCI including a precoding information (PMI) field (determined according to an RI when the corresponding RI exists). At this time, the precoding information field indicates a group of a precoding vector used for uplink transmission allocated to the corresponding terminal. Information on the group of the precoding vector is wideband information, and may be equally used in the allocated entire uplink band. The terminal can apply precoder cycling to beams belonging to the notified precoding vector group according to a predetermined pattern.

The precoding vector group or the beam group can be defined through the following two methods.

A first method is a method of defining a beam group on the basis of a hierarchical PMI. For example, the PMI indicating one code point may include two or more sub PMIs. If it is assumed that the PMI consists of two sub PMIs, it may be agreed that a first PMI is one of beam group indexes including a specific number of precoding vectors and a second PMI is one of indexes of precoding vectors included in the beam group. For example, an uplink codebook including beam groups $G_i$ including B DFT precoding vectors $v_k$ based on M terminal transmission antennas and an oversampling factor of O may be defined as [Equation 1] below.

$$v_k = \frac{1}{\sqrt{M}} \times \begin{bmatrix} 1 & e^{j\frac{2\pi k}{OM}} & e^{j\frac{4\pi k}{OM}} & \cdots & e^{j\frac{2\pi(M-1)k}{OM}} \end{bmatrix}^T \quad \text{[Equation 1]}$$

$$G_i = [v_{Ai} \ v_{mod(Ai+1,OM)} \ \cdots \ v_{mod(Ai+B-2,OM)} \ v_{mod(Ai+B-1,OM)}]$$

Here, A is a beam-skipping factor and denotes the interval between beam groups (beam unit). In this example, a first PMI i is an index of the beam group, and a single precoding vector can be designated by a second PMI having a payload of ($\log_2 B$).

A second method is a method of defining a beam or a beam group on the basis of a single-structure PMI. For example, one PMI may be understood as an indicator indicating a single beam or beam group according to higher-layer or physical-layer signaling. For example, an uplink codebook including M terminal transmission antennas, an $i^{th}$ DFT precoding vector $v_i$ based on and an oversampling factor of O, and beam groups $G_i$ including B DFT precoding vectors may be defined as [Equation 2] below.

$$v_i = \frac{1}{\sqrt{M}} \times \begin{bmatrix} 1 & e^{j\frac{2\pi i}{OM}} & e^{j\frac{4\pi i}{OM}} & \cdots & e^{j\frac{2\pi(M-1)i}{OM}} \end{bmatrix}^T \quad \text{[Equation 2]}$$

$$G_i = [v_i \ v_{mod(i+1,OM)} \ \cdots \ v_{mod(i+B-2,OM)} \ v_{mod(i+B-1,OM)}]$$

In this example, an $i^{th}$ PMI may be understood to indicate $v_i$ when the higher-layer or physical-layer signaling indicates dynamic beamforming or wideband precoding. On the other hand, the $i^{th}$ PMI may be understood to indicate $G_i$ when the higher-layer or physical-layer signaling indicates semi-dynamic beamforming or subband precoding. [Table 2] shows an example of a TPMI analysis method when dynamic or semi-dynamic beamforming transmission or wideband or subband precoding is designated by higher-layer signaling in this example. [Table 3] shows an example of a TPMI analysis method when dynamic or semi-dynamic beamforming transmission or wideband or subband precoding is designated by higher-layer signaling in this example.

TABLE 2

| | Precoder or precoder group | |
|---|---|---|
| PMI value i | BeamformingScheme = 'Dynamic' | BeamformingScheme = 'Semi-dynamic' |
| 0 | $v_0$ | $G_0$ |
| 1 | $v_1$ | $G_1$ |
| 2 | $v_2$ | $G_2$ |
| ... | ... | ... |
| OM − 1 | $v_{OM-1}$ | $G_{OM-1}$ |

TABLE 3

| | Interpretation | |
|---|---|---|
| PMI value i | Beamforming scheme | Precoder or precoder group |
| 0 | Dynamic | Precoder v0 |
| 1 | Dynamic | Precoder v1 |
| 2 | Dynamic | Precoder v2 |
| ... | ... | ... |
| OM − 1 | Dynamic | Precoder $v_{OM-1}$ |
| OM | Semi-dynamic | Precoder group $G_0$ |
| OM + 1 | Semi-dynamic | Precoder group $G_1$ |
| OM + 2 | Semi-dynamic | Precoder group $G_2$ |
| ... | ... | ... |
| 2OM − 1 | Semi-dynamic | Precoder group $G_{OM-1}$ |

In [Equation 1] and [Equation 2], it is assumed that terminal transmission antennas form a one-dimensional antenna array and thus the codebook includes one-dimensional DFT vectors, but another type of uplink codebook may be used if the terminal transmission antennas form a two-dimensional antenna array. For example, if the terminal transmission antenna array includes $M_1$ antenna ports in a first dimension and $M_2$ antenna ports in a second dimension, a precoding vector $v_{m_1,m_2}$ and a beam group $G_{m_1,m_2}$ may be defined as shown in [Equation 3] through a pair of indexes ($m_1$, $m_2$).

$$v_{m_1,m_2} = \quad \text{[Equation 3]}$$

$$\frac{1}{\sqrt{M_1 M_2}} \times \begin{bmatrix} 1 & e^{j\frac{2\pi m_1}{O_1 M_1}} & e^{j\frac{4\pi m_1}{O_1 M_1}} & \cdots & e^{j\frac{2\pi(M_1-1)m_1}{O_1 M_1}} \end{bmatrix}^T \otimes$$

$$\begin{bmatrix} 1 & e^{j\frac{2\pi m_2}{O_2 M_2}} & e^{j\frac{4\pi m_2}{O_2 M_2}} & \cdots & e^{j\frac{2\pi(M_2-1)m_2}{O_2 M_2}} \end{bmatrix}^T = v_{m_1} \otimes v_{m_2}$$

$$G_{m_1,m_2} = G_{m_1} \otimes G_{m_2}$$

$$G_{m_i} = [v_{m_i} \ v_{mod(m_i+1,O_i M_i)} \ \cdots \ v_{mod(m_i+B_i-2,O_i M_i)} \ v_{mod(m_i+B_i-1,O_i M_i)}]$$

It is assumed that terminal transmission antennas have the same polarization in [Equation 1], [Equation 2], and [Equation 3], but if the terminal transmission antennas have a dual-polarized array, examples of the uplink codebook can be changed in consideration thereof. For example, if the terminal transmission antennas have a one-dimensional array including M antenna arrays for each polarization, that is, a total of 2M antenna ports, a rank 1 precoding vector $v_{i,k}$ and a beam group $G_m$ as shown in [Equation 4] can be defined.

$$v_{i,k} = \frac{1}{\sqrt{2M}} \times \begin{bmatrix} d_i \\ \phi_k d_i \end{bmatrix} \quad \text{[Equation 4]}$$

$$d_i = \begin{bmatrix} 1 & e^{j\frac{2\pi i}{OM}} & e^{j\frac{4\pi i}{OM}} & \cdots & e^{j\frac{2\pi(M-1)i}{OM}} \end{bmatrix}^T,$$

$$\phi_k = e^{j 2\pi k / K}$$

$$G_m =$$

$$[v_m \ v_{mod(m+1,OM)} \ \cdots \ v_{mod(m+B-2,OM)} \ v_{mod(m+B-1,OM)}],$$

$$m = (K-1)i + k$$

In [Equation 4], K denotes a co-phasing quantization level.

In another example, if the terminal transmission antennas have a two-dimensional array including $M_1 M_2$ antenna ports for each polarization, that is, a total of $2M_1M_2$ antenna ports, a rank 1 precoding vector $v_{m_1,m_2,k}$ as shown in [Equation 5] below can be defined. $M_1$ and $M_2$ are numbers of terminal transmission antenna ports for each polarization included in the first dimension and the second dimension. In the case of the beam group, a configuration similar to [Equation 3] can be made on the basis of $v_{m_1,m_2,k}$ of [Equation 5].

$$v_{m_1,m_2,k} = \frac{1}{\sqrt{2M_1M_2}} \times \begin{bmatrix} d_{m_1} \otimes d_{m_2} \\ e^{j\phi_k} d_{m_1} \otimes d_{m_2} \end{bmatrix}$$ [Equation 5]

$$d_{m_1} = \begin{bmatrix} 1 & e^{j\frac{2\pi m_1}{O_1 M_1}} & e^{j\frac{4\pi m_1}{O_1 M_1}} & \dots & e^{j\frac{2\pi(M_1-1)m_1}{O_1 M_1}} \end{bmatrix}^T$$

$$d_{m_2} = \begin{bmatrix} 1 & e^{j\frac{2\pi m_2}{O_2 M_2}} & e^{j\frac{4\pi m_2}{O_2 M_2}} & \dots & e^{j\frac{2\pi(M_2-1)m_2}{O_2 M_2}} \end{bmatrix}^T$$

It is apparent that the dynamic/semi-dynamic beamforming or wideband/subband precoding signaling example, that is, [Table 2] and [Table 3], can be easily applied to the codebook examples.

The examples have been described on the basis of the rank 1 codebook indicating a single direction, but this principle is not limiting in actual implementation, and can be equally applied to codebooks of rank 2 or higher pointing to two or more directions.

The examples assume the case in which UL DCI includes one TPMI, and the terminal receiving the TPMI can apply uplink precoding for one beam direction or one beam group to the entire uplink band.

Figure 6:
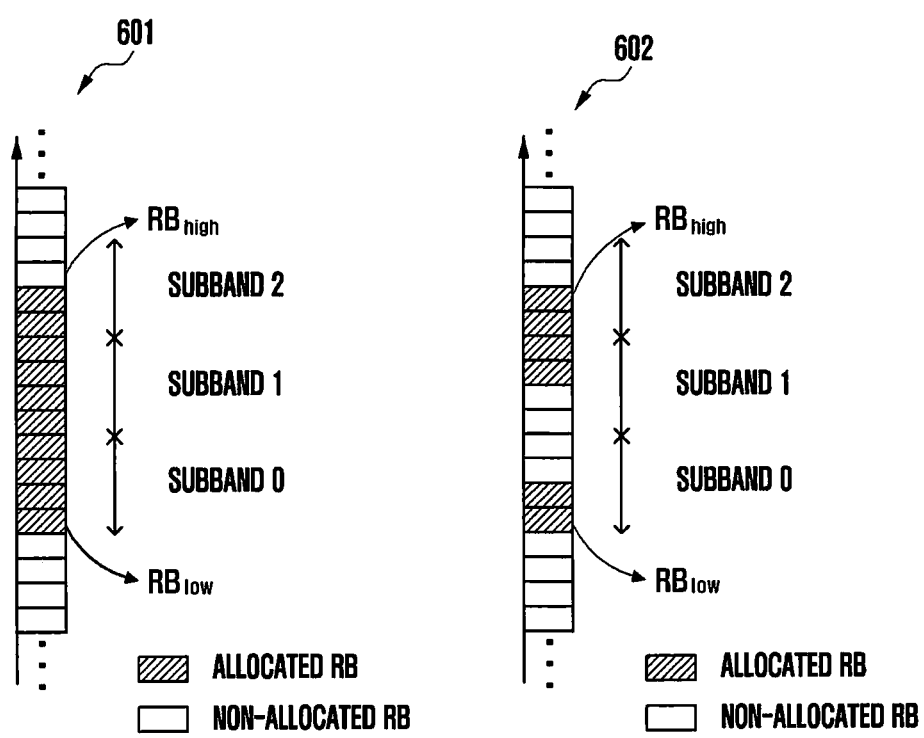
FIG. 6 illustrates an example of uplink resource allocation and uplink subband precoding in an NR system.

FIG. 6 illustrates an example of allocating resources for uplink transmission and applying subband precoding. For example, the base station may transmit $N_{PMI}$ TPMIs including precoding information for a plurality of subbands, for example, $N_{PMI}$ subbands, through UL DCI for subband precoding. The value of $N_{PMI}$ is determined by the number $RA_{RB}$ of uplink resources (RBs) allocated to the terminal, the number $P_{SUBBAND}$ of RBs included in the subband, and an uplink resource allocation method. Reference numeral 601 indicates uplink resources when contiguous RBs are allocated, and reference numeral 602 indicates uplink resources when clustered RBs are allocated. In FIG. 6, it is assumed that $P_{SUBBAND}=4$. If resources are allocated as indicated by reference numeral 601 of FIG. 6, that is, if resources configured as one cluster are allocated, the number of necessary subbands can be calculated through [Equation 6] based on $RA_{RB}$ and $P_{SUBBAND}$. The cluster is a set of contiguously allocated uplink RBs.

$$N_{PMI} = \left(\frac{RA_{RB}}{P_{SUBBAND}}\right)$$ [Equation 6]

However, if resources configured as one or more clusters are allocated as indicated by reference numeral 602, the calculation of [Equation 6] may not be accurate, in which case $N_{PMI}$ can be calculated on the basis of the method of [Equation 7] or [Equation 8]. [Equation 7] is a method for calculating $N_{PMI}$ on the basis of the lowest index $RB_{low}$ and the highest index $RB_{high}$ among the allocated RBs. [Equation 8] is a method of calculating $N_{PMI}$ on the basis of the number of contiguous RBs allocated for each cluster. In [Equation 8], $RA_{RB,n}$ is the number of contiguous RBs allocated to an nth cluster, and N is the number of clusters allocated to the terminal.

$$N_{PMI} = \left(\frac{RB_{high} - RB_{low} + 1}{P_{SUBBAND}}\right)$$ [Equation 7]

$$N_{PMI} = \left(\frac{RA_{RB,1}}{P_{SUBBAND}}\right) + \dots + \left(\frac{RA_{RB,N}}{P_{SUBBAND}}\right)$$ [Equation 8]

If one uplink PMI includes T bits, transmission of TPMI payload of $N_{PMI}T$ bits may be needed for uplink subband precoding in the example. This means that scores of bits or more may be needed for TPMI signaling when several subbands and a codebook of several bits are used. This may be an excessive burden on transmission through UL DCI, and it may be required to limit the number of TPMIs to be signaled through one piece of DCI (or a set of first DCI and second DCI).

Figure 7:
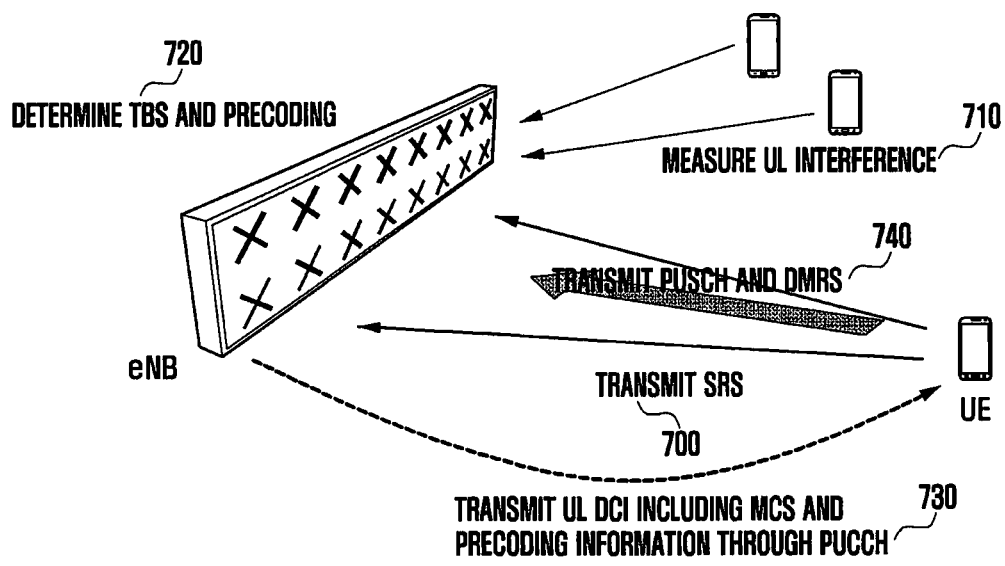
FIG. 7 illustrates an uplink transmission process when a base station determines all pieces of uplink precoding information.

FIG. 7 illustrates a general example of an uplink transmission process including precoding. First, the terminal transmits an SRS according to signaling of the base station in step 700. The base station measures channel information on the basis of the SRS transmitted by the terminal and measures information on interference from another terminal in step 710. Thereafter, the base station determines uplink transmission configuration, such as resource allocation, TBS, and TPMI, in step 720 and informs the terminal of the same through UL DCI in step 730. The base station may estimate the validity of subband precoding of the terminal on the basis of the uplink channel information and the interference information, and if it is determined that the subband precoding is not valid, may not allow the terminal to apply the subband precoding. Thereafter, the terminal may determine precoding according to the received UL DCI and transmit uplink data and a demodulation reference signal (DMRS), and the base station may receive the same in step 740.

In the LTE system, a plurality of allocation methods is supported for resource allocation. The resource allocation methods may be divided into 1) a resource allocation method using a bitmap and 2) a method of indicating a start point and the size of resources (or an end point). At this time, if each resource allocation is indicated on the basis of the PRB, indication of a maximum of 100 PRBs, as shown in [Table 4], is needed in the case of the LTE system. In the case of the NR system, assuming a maximum of 3300 subcarriers, as shown in [Table 5], indication of about 270 PRBs is needed if the 4096 FFT size is supported and indication of 500 PRBs or more is needed if the 8192 FFT size is supported, and thus very large DCI overhead may result.

TABLE 4

| | Channel bandwidth $BW_{Channel}$ [MHz] | | | | | |
| --- | --- | --- | --- | --- | --- | --- |
| | 1.4 | 3 | 5 | 10 | 15 | 20 |
| Transmission bandwidth configuration $N_{RB}$ | 6 | 15 | 25 | 50 | 75 | 100 |

TABLE 5

| SCS(kHz) | RB size | Channel bandwidth (MHz) | | | | | | |
|---|---|---|---|---|---|---|---|---|
| | | 5 | 10 | 40 | 80 | 100 | 200 | 400 |
| 15 | 180 kHz | 27.5 | 55 | 220 | 440 | 550 | 1100 | 2200 |
| 30 | 360 kHz | 13.75 | 27.5 | 110 | 220 | 275 | 550 | 1100 |
| 60 | 720 kHz | 6.875 | 13.75 | 55 | 110 | 137.5 | 275 | 550 |
| 120 | 1.44 MHz | 3.4375 | 6.875 | 27.5 | 55 | 68.75 | 137.5 | 275 |
| 240 | 2.88 MHz | 1.71875 | 3.4375 | 13.75 | 27.5 | 34.375 | 68.75 | 137.5 |
| 480 | 5.76 MHz | 0.859375 | 1.71875 | 6.875 | 13.75 | 17.1875 | 34.375 | 68.75 |

One of the methods of solving the problem is to define a resource block group (RBGs) including one or more PRBs and reduce signaling overhead for resource allocation if a bandwidth is wide. For example, in the case of resource allocation type 0, as shown in [Table 6] below, the LTE system provides the RBG size for each system bandwidth. Referring to [Table 4] and [Table 6], even when the system bandwidth is 20 MHz (a total of 100 PRBs), a bitmap for resource allocation is limited to a maximum of 25 bits (one PRG consists of 4 PRBs).

TABLE 6

| System bandwidth $N^{DL}_{RB}$ | RBG size (P) |
|---|---|
| ≤10 | 1 |
| 11-26 | 2 |
| 27-63 | 3 |
| 64-110 | 4 |

Meanwhile, in the NR system, the system bandwidth may expand to a maximum of 400 MHz, as shown in [Table 5]. In this case, even though the PBG is used, an excessive DCI burden may still be imposed on resource allocation. In order to solve the problem, a resource allocation method having the two steps described below can be used. First, the system bandwidth may be divided into one or more bandwidth parts. For example, if the system bandwidth is 400 MHz and a bandwidth of the bandwidth part is 20 MHz, the system bandwidth may be divided into a total of N=20 bandwidth parts. The base station may notify the terminal whether to allocate the bandwidth parts through higher-layer signaling or L1 signaling (for example, a bitmap) in first-step resource allocation. Thereafter, the base station can perform resource allocation within the bandwidth parts allocated to the terminal on the basis of the RBG through second-step resource allocation.

For convenience of description in the above and following examples, it is assumed that the bandwidths of respective bandwidth parts are all the same and that frequency resources indicated by respective bandwidth parts do not overlap each other, but this is only an example, and bandwidths of respective bandwidth parts may have different values, or frequency resources indicated by respective bandwidth parts may overlap each other in the actual application. Further, the term "bandwidth part" is used to help understanding of the following embodiments, and can be replaced with various terms such as "resource (PUSCH) group", "resource subgroup", and "resource (PUSCH) cluster" in the actual application.

In addition, for convenience of description in the above and following examples, the system bandwidth is taken as the maximum bandwidth in one serving cell, but this is only for convenience of description, and can be interchanged with various terms such as "terminal bandwidth" or "maximum terminal bandwidth" from the viewpoint of the terminal rather than the viewpoint of the system in the actual application.

First Embodiment

A first embodiment describes semi-static PRB bundling. As described above, when uplink subband precoding is applied, it is required to limit the number of TPMIs to be signaled through one piece of DCI (or a set of first DCI and first DCI) in order to secure sufficient PDCCH coverage. One method therefor is to define uplink PRB bundling through interworking with the resource allocation method.

Figure 8:
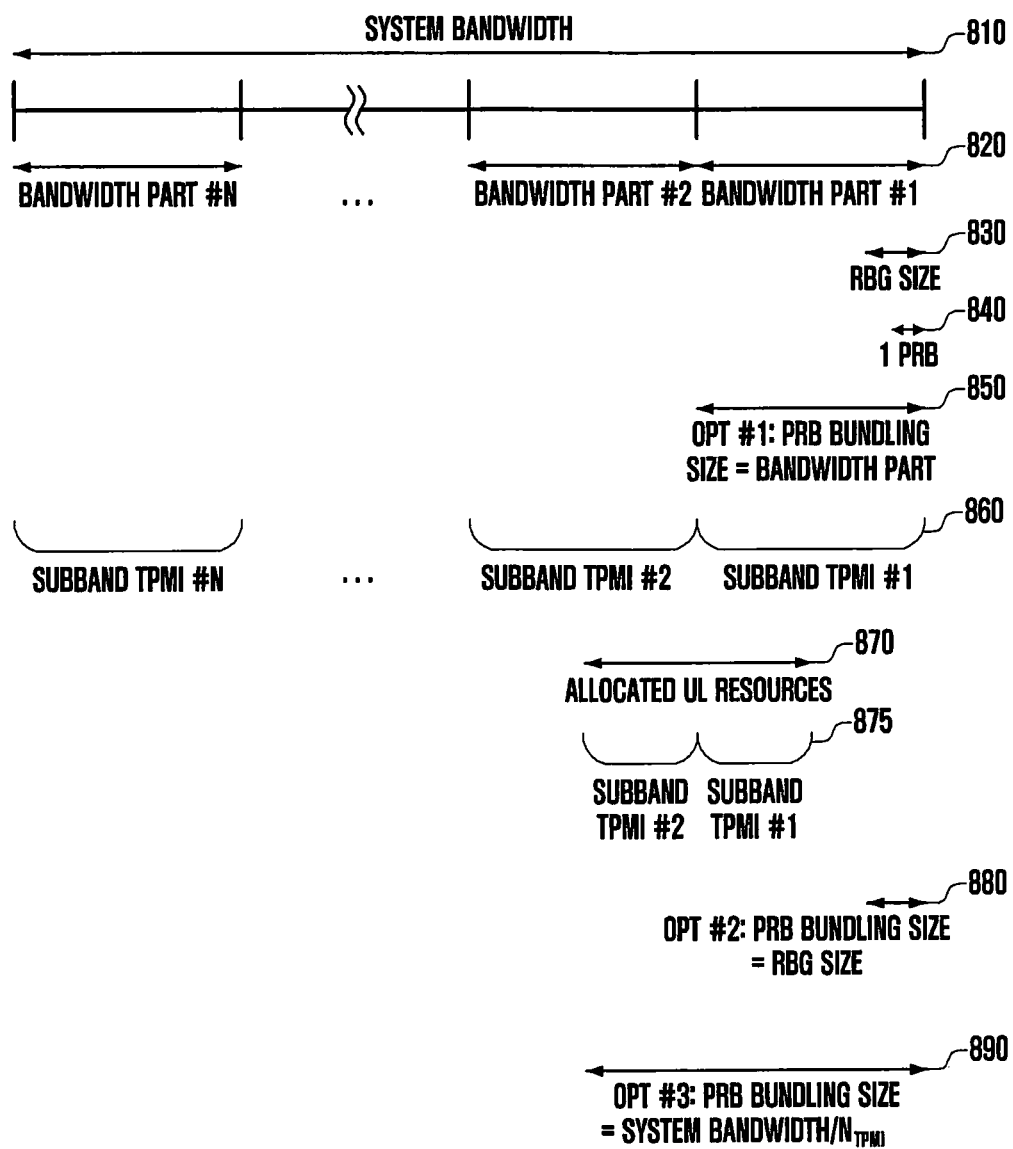
FIG. 8 illustrates a method of determining the UL PRB bundling size according to an embodiment of the disclosure.

The uplink PRB bundling means that the same uplink precoding is applied within a predetermined PRB group. That is, as the PRB bundling size is larger, the number of subband TPMIs becomes smaller and the required DCI payload also decreases. On the other hand, as the PRB bundling size is larger, subband precoding gain becomes smaller and thus a performance deterioration occurs. Semi-static UL PRB bundling may be considered as one of the methods of defining the uplink PRB bundling. In the semi-static UL PRB bundling, a reference point for determining the PRB bundling size may include three points, such as 1) bandwidth part, 2) RBG, and 3) system bandwidth and $N_{TPMI}$. FIG. 8 illustrates an example of three semi-static methods of determining the PRB bundling size.

Method 1 is a method of determining the UL PRB bundling size on the basis of the bandwidth part. In FIG. 8, a system bandwidth 810 includes N bandwidth parts 820. Although FIG. 8 assumes that one bandwidth part 820 consists of four RBGs 830 and one RBG 830 consists of two PRGs 840, this is only an example for convenience of description, and it will be apparent that various values can be applied to the actual application.

In method 1, the UL PRB bundling size is the same as the bandwidth of the bandwidth part, as indicated by reference numeral 850. Accordingly, the maximum number of TPMIs that one terminal can receive is N. At this time, it may be agreed that a first subband TPMI is mapped to (that is, corresponds to) a first bandwidth part, a second TPMI is mapped to a second bandwidth part, and an $n^{th}$ TPMI is mapped to an $n^{th}$ bandwidth part. In method 1, 1) only TPMIs corresponding to bandwidth parts allocated to the terminal may be signaled, or 2) TPMIs corresponding to all bandwidth parts may be provided regardless of resource allocation. For example, if only TPMIs corresponding to the bandwidth parts allocated to the terminal are signaled and the terminal receives resources of bandwidth parts #1 and #2, as in the first case, it may be noted that the base station signals (subband) TPMI #1 and TPMI #2 for bandwidth part #1 to the terminal and that the terminal applies TPMI #1 and TPMI #2, as indicated by reference numeral 875. That is, TPMI #1 may be applied to bandwidth part #1 and TPMI #2 may be applied to bandwidth part #2. Additional detailed matters pertaining to TPMI signaling will be described in detail with reference to a third embodiment below.

Method 2 is a method of determining the UL PRB bundling size on the basis of the RBG size. In FIG. 8, a system bandwidth 810 includes N bandwidth parts 820. Although FIG. 8 assumes that one bandwidth part 820 consists of four RBGs 830 and one RBG 830 consists of two PRGs 840, this is only an example for convenience of description, and it will be apparent that various values can be applied to the actual application.

In method 2, it can be appointed that L RBGs are one UL PRB bundling size, and if L=1, as indicated by reference numeral 880, the PRB bundling size is the same as the RBG size. In this case, UL subband precoding may have the same granularity as UL resource allocation, but signaling overhead increases. When a value of L>1 is used, granularity of UL subband precoding may decrease but signaling overhead may be improved. In method 2, a plurality of TPMIs and PRB bundling groups can be mapped in ascending order or descending order according to signaling, as in method 1. Similar to method 1, additional detailed matters according to TPMI signaling will be described in detail with reference to the third embodiment below.

Method 3 is a method of determining the UL PRB bundling size on the basis of a system bandwidth and a function of $N_{TPMI}$ (a set number of TPMIs or a maximum number of TPMIs). In FIG. 8, a system bandwidth 810 includes N bandwidth parts 820. Although FIG. 8 assumes that one bandwidth part 820 consists of four RBGs 830 and one RBG 830 consists of two PRGs 840, this is only an example for convenience of description, and it is apparent that various values can be applied to the actual application.

In method 3, the system bandwidth is divided into bandwidth parts corresponding to the number of TPMIs to define the PRB bundling size as indicated by reference numeral 890. At this time, $N_{TPMI}$ corresponding to the number of TPMIs may be the number of signaled TPMIs, subband TPMIs, or SRS resource indicators (SRIs), a maximum number of TPMIs configured through higher layer or/and L1 signaling, a maximum number of subband TPMIs, or a maximum number of SRIs. In method 3, a plurality of TPMIs and PRB bundling groups can be mapped in ascending order or in descending order according to signaling, as in method 1. Similar to method 1, additional detailed matters according to TPMI signaling will be described in detail with reference to the third embodiment below.

Second Embodiment

A second embodiment describes dynamic uplink PRB bundling. As described above, when uplink subband precoding is applied, it is required to limit the number of TPMIs to be signaled through one piece of DCI (or a set of first DCI and second DCI) in order to secure sufficient PDCCH coverage. One method therefor is to define uplink PRB bundling through interworking with the resource allocation method. The uplink PRB bundling means that the same uplink precoding is applied within a predetermined PRB group. That is, as the PRB bundling size increases, the number of required subband TPMIs becomes smaller and the required DCI payload also decreases. On the other hand, as the PRB bundling size increases, subband precoding gain becomes smaller and thus a performance deterioration occurs.

The semi-static PRB bundling described in the first embodiment has an advantage of simple implementation of the terminal since the bundling size is uniform, but has a disadvantage of significantly low flexibility for subband precoding band control if the number of signaled TPMIs is small. Dynamic UL PRB bundling may be considered as one of the methods to solve the problem. The reference point for determining the PRB bundling size in the dynamic. UL PRB bundling may largely include two points, namely 1) allocated resource block sets (that is, clusters) and 2) an allocated bandwidth (within a system bandwidth or a cluster) and $N_{TPMI}$ (the number of TPMIs or the maximum number of TPMIs configured within the system bandwidth or the cluster).

Figure 9:
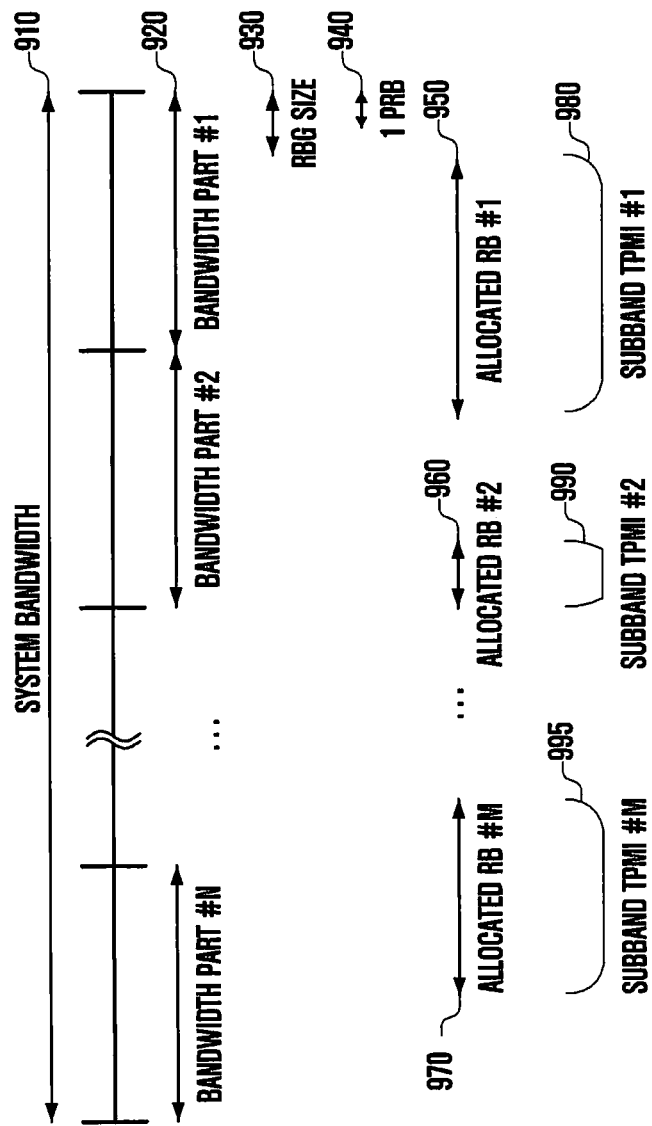
FIG. 9 illustrates a method of determining the UL PRB bundling size on the basis of bandwidth parts according to an embodiment of the disclosure.

Method 4 is a method of determining the UL PRB bundling on the basis of allocated resource block sets. FIG. 9 illustrates an example of the UL PRB bundling determination method according to method 4. In FIG. 9, a system bandwidth 910 includes N bandwidth parts 920. Although FIG. 9 assumes that one bandwidth part 920 consists of four RBGs 930 and one RBG 930 consists of two PRGs 940, this is only an example for convenience of description, and it will be apparent that various values can be applied to the actual application.

In FIG. 9, it is assumed that a total of M clusters are allocated to one terminal, as indicated by reference numerals 950, 960, and 970. One cluster refers to an allocated resource block set allocated to the terminal, which includes contiguous RBGs. In method 4, the bandwidth of allocated clusters is the same as the UL PRB bundling size. That is, the PRB bundling size to which TPMI #1 for cluster #1 consisting of four RBGs is applied is 980, the PRB bundling size to which TPMI #2 for cluster #2 consisting of one RBG is applied is 990, and the PRB bundling size to which TPMI #M for cluster #M consisting of three RBGs is applied is 995. In method 4, the maximum number of TPMIs that one terminal can receive is the same as the maximum number of clusters that the terminal can receive. A non-uniform UL PRB bundling size can be configured according to uplink resource allocation of the base station in method 4, so that it is possible to secure excellent subband precoding granularity in spite of signaling of the limited number of TPMIs. In method 4, a plurality of TPMIs and PRB bundling groups can be mapped in ascending order or descending order according to signaling, as in method 1. Similar to method 1, additional detailed matters according to TPMI signaling will be described in detail with reference to the third embodiment below.

Figure 10:
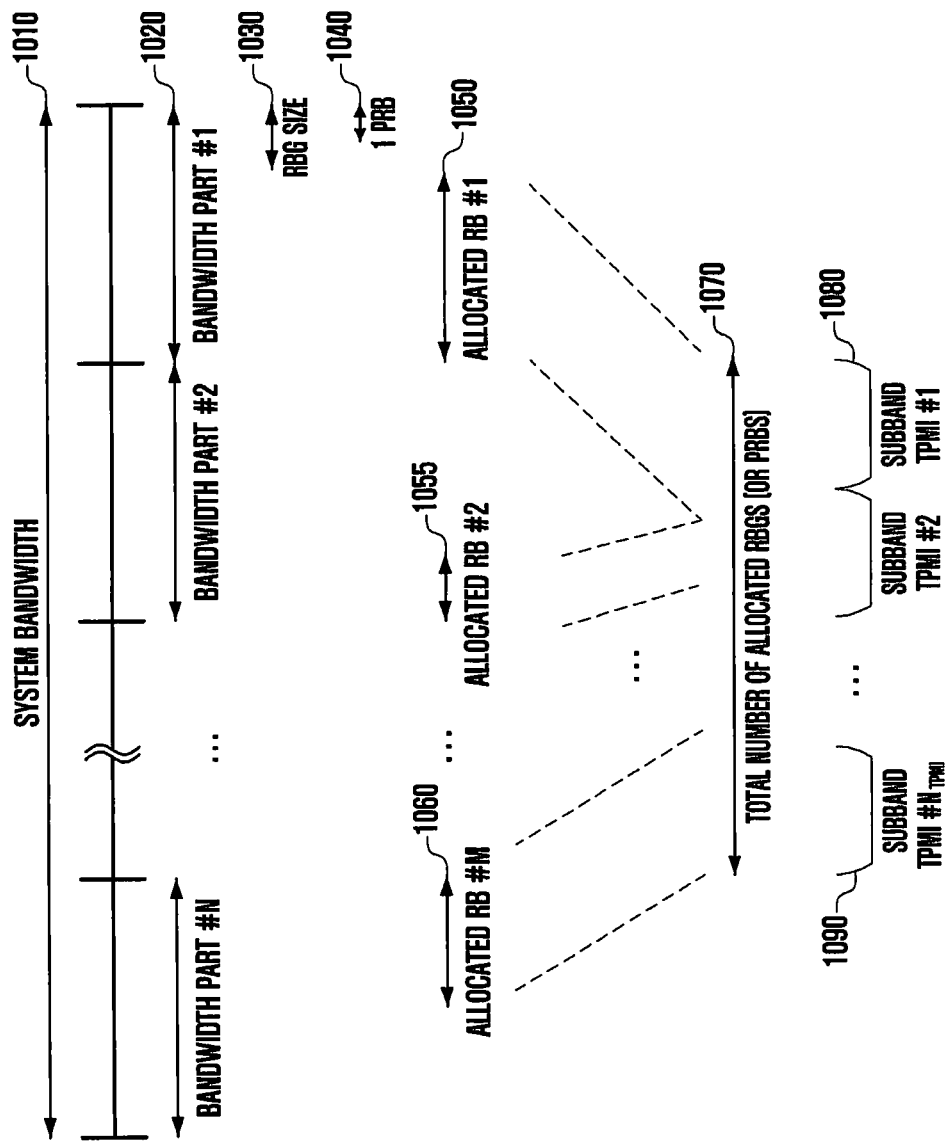
FIG. 10 illustrates a method of determining the UL PRB bundling size according to an embodiment of the disclosure.

Method 5 is a method of determining the UL PRB bundling size on the basis of the bandwidth allocated within the system bandwidth or the cluster, the number of TPMIs configured within the system bandwidth or the cluster, and a function $N_{TPMI}$ corresponding to the maximum number of TPMIs. FIG. 10 illustrates an example of the UL PRB bundling determination method according to method 5. In FIG. 10, a system bandwidth 1010 includes N bandwidth parts 1020. Although FIG. 10 assumes that one bandwidth part 1020 consists of four RBGs 1030 and that one RBG 1030 consists of two PRGs 1040, this is only an example for convenience of description, and it will be apparent that various values can be applied to the actual application.

Figure 11:
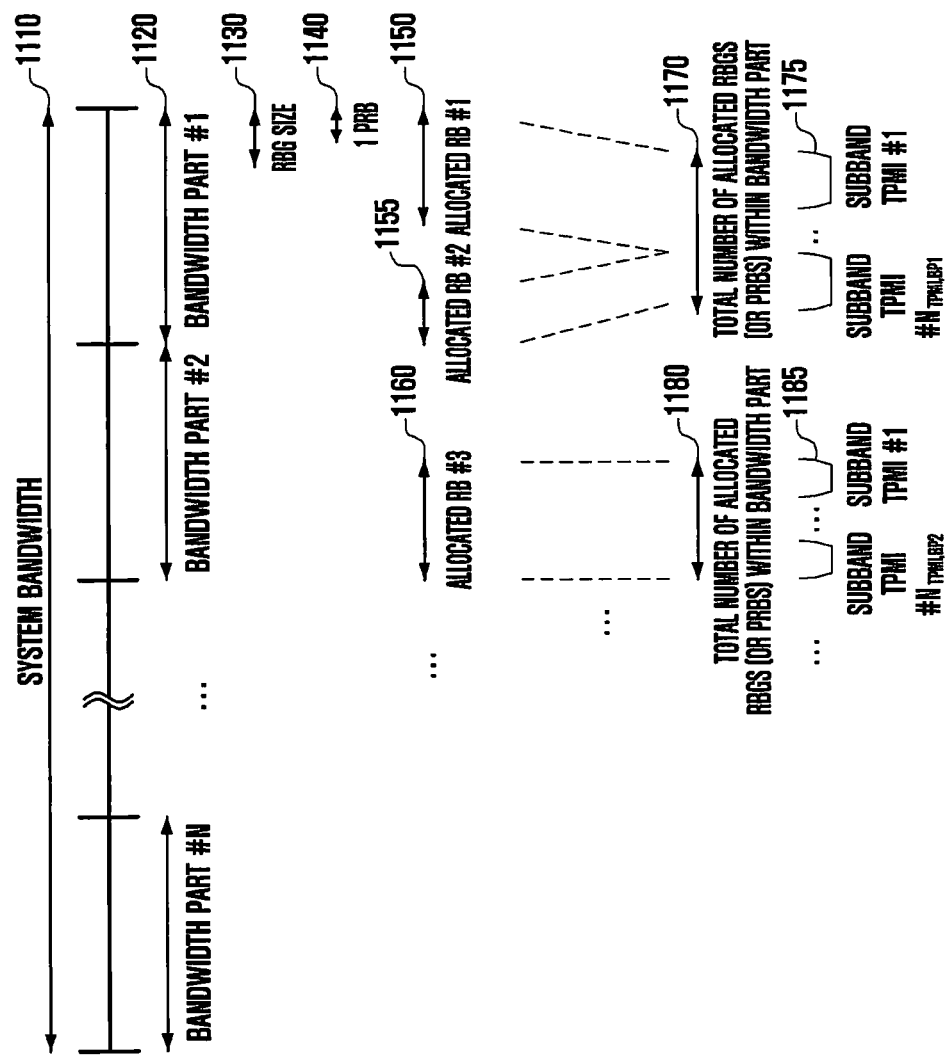
FIG. 11 illustrates a method of determining the UL PRB bundling size according to an embodiment of the disclosure.

In FIG. 10, it is assumed that a total of M clusters is allocated to one terminal, as indicated by reference numerals 1050, 1055, and 1060. One cluster refers to a resource block set allocated to the terminal, which includes contiguous RBGs. In this example of method 5, a total bandwidth 1070 of resources allocated through the M clusters is divided into $N_{TPMI}$ bandwidth parts corresponding to a maximum number of TPMIs, a maximum number of subband TPMIs, or a maximum number of SRIs configured through higher-layer or/and L1 signaling, as indicated by reference numeral 1080. In this example, expansion of the operation based on the bandwidth parts can be made as illustrated in FIG. 11. It is assumed that one $N_{TPMI}$ is configured in the terminal for the entire band in the first example, but, unlike this, individual $N_{TPMI,BP}$ can be signaled according to each bandwidth part. Furthermore, $N_{TPMI,BP,i}$ for an $i^{th}$ bandwidth part may be the same as $N_{TPMI,BP,j}$ for a $j^{th}$ bandwidth part. That is, $N_{TPMI,BP,i} = N_{TPMI,BP,j}$.

FIG. 11 illustrates another example of the UL PRB bundling size determination method according to method 5. In FIG. 11, a system bandwidth 1110 includes N bandwidth parts 1120. Although FIG. 11 assumes that one bandwidth part 1120 consists of four RBGs 1130 and that one RBG 1130 consists of two PRGs 1140, this is only an example for convenience of description, and it will be apparent that various values can be applied to the actual application.

It is assumed that first three clusters among a total of M clusters configured in one terminal may be allocated, as indicated by reference numerals 1150, 1155, and 1160. One cluster refers to a resource block set allocated to the terminal, which includes contiguous RBGs. In this example, the M clusters are first grouped according to each bandwidth part. For example, cluster #1 1150 and cluster #2 1155 are included in bandwidth part #1 and thus may be converted into one resource set 1170 and may be divided into $N_{TPMI,BP,1}$ for the first bandwidth part as indicated by reference numeral 1175. On the other hand, cluster #3 1160 is included in bandwidth part #2 and thus may be converted into another resource set 1180 and may be divided into $N_{TPMI,BP,2}$ for the second bandwidth part as indicated by reference numeral 1185. Method 5 has an advantage of controlling subband precoding granularity according to the size of resources allocated to the terminal.

Third Embodiment

The third embodiment describes a method of controlling a maximum number of TPMIs, a maximum number of subband TPMIs, or a maximum number of SRIs, that is, $N_{TPMI}$ that the base station can signal to the terminal through one piece of DCI (or one DCI set including first DCI and second DCI). The third embodiment can be independently applied, or can be applied together with the first embodiment or the second embodiment. $N_{TPMI}$ which can be included in one piece of DCI (or the DCI set) can be determined according to 1) the size or the number of bandwidth parts, 2) RRC or/and MAC CE configuration, 3) configuration of DCI transmitted through a common search space (CSS), or 4) configuration of DCI transmitted through a UE-specific search space (USS) (for example, the size of allocated PUSCH or PUCCH resources).

In the first method, if $N_{TPMI}$ or $N_{TPMI,BP}$ that can be included in one piece of DCI (or the DCI set) is determined according to the size of the bandwidth parts (that is, the bandwidth) or the number of bandwidth parts, the values are semi-statically determined according to the size of the bandwidth parts or the configuration and the number of bandwidth parts configured by an MIB, SIB, or/and RRC. If the maximum $N_{TPMI}$ or the maximum $N_{TPMI,BP}$ is directly configured by RRC or MAC CE, as in the second method, the configuration values may be changed more rapidly than in the first example, but it takes several ms or more to apply the configuration values, so that $N_{TPMI}$ is semi-statically configured. On the other hand, if the maximum $N_{TPMI}$ or the maximum $N_{TPMI,BP}$ is configured according to CSS DCI configuration, as in the third method, the maximum $N_{TPMI}$ or the maximum $N_{TPMI,BP}$ can be group-specifically and dynamically allocated. Last, if the maximum $N_{TPMI}$ or the maximum $N_{TPMI,BP}$ is configured according to USS DCI configuration, as in the fourth method, the maximum $N_{TPMI}$ or the maximum $N_{TPMI,BP}$ can be terminal-specifically dynamically configured but signaling overhead may significantly increase.

If $N_{TPMI}$ is determined according to the bandwidth of the bandwidth parts on the basis of the first method, $N_{TPMI}$ may be determined in inverse proportion to the bandwidth of the bandwidth parts. If the bandwidth of the bandwidth parts is wider than a specific value, it may be agreed that $N_{TPMI}$ is fixed to 1 (that is, in this case, subband precoding is not supported). On the other hand, if $N_{TPMI,BP}$ is determined according to the bandwidth of the bandwidth parts, $N_{TPMI,BP}$ may be determined in proportion to the bandwidth of the bandwidth parts. If the bandwidth of the bandwidth parts is smaller than a specific value, it may be agreed that $N_{TPMI,BP}$ is fixed to 1 (that is, in this case, subband precoding is not supported).

If $N_{TPMI}$ is determined according to the number of bandwidth parts within the system bandwidth, $N_{TPMI}$ may be determined in proportion to the number of bandwidth parts. If the number of bandwidth parts is smaller than a specific value, it may be agreed that $N_{TPMI}$ is fixed to 1 (that is, in this case, subband precoding is not supported). On the other hand, if $N_{TPMI,BP}$ is determined according to the number of bandwidth parts within the system bandwidth, $N_{TPMI,BP}$ may be determined in inverse proportion to the function of the number of the bandwidth parts within the system bandwidth. For example, if {number of bandwidth parts within system bandwidth} is smaller than a specific value, it may be agreed that $N_{TPMI,BP}$ is fixed to 1 (that is, in this case, subband precoding is not supported).

In the above description, the maximum $N_{TPMI}$ or the maximum $N_{TPMI,BP}$ is explicitly or implicitly configured by DCI transmitted through RRC, MAC CE, or CSS or DCI transmitted through USS, and similar application can be made to the third and fourth methods, but a detailed description thereof will be omitted.

In the specific case, the configured maximum $N_{TPMI}$ or maximum $N_{TPMI,BP}$ may be different from $N_{TPMI}$ or $N_{TPMI,BP}$ required for actual transmission of the PUCCH and/or PUSCH. Accordingly, this may cause uncertainty when the terminal determines how many TPMIs are included in DCI (or the DCI set). In order to resolve mismatching, the following methods are proposed. It may be agreed that 1) the terminal assumes that (the configured maximum $N_{TPMI}$ or the number of bandwidth parts×the maximum $N_{TPMI,BP}$) TPMIs are always included in DCI (or the DCI set) or 2) the terminal assumes that the payload for TPMIs in actual DCI (or the DCI set) varies depending on $N_{TPMI}$ or $N_{TPMI,BP}$ required for actual transmission of the PUCCH and/or PUSCH.

If the terminal assumes that (the configured maximum $N_{TPMI}$ or the number of bandwidth parts×the maximum $N_{TPMI,BP}$) TPMIs are always included in DCI (or the DCI set) according to the first method, the payload of the DCI (or the DCI set) is fixed, and thus there is an advantage of not increasing the complexity of DCI blind decoding of the terminal. If the maximum $N_{TPMI}$ or the maximum $N_{TPMI,BP}$ is smaller than $N_{TPMI}$ or $N_{TPMI,BP}$ required for actual transmission of the PUCCH or the PUSCH, the base station may fill predetermined bits (for example, 00 . . . 0) in the remaining parts of the DCI and transmit the DCI so as to expand the DCI coverage. In this example, method 1 to method 5 can be applied to all embodiments.

If the terminal assumes that the payload for the TPMIs in actual DCI (or the DCI set) varies depending on $N_{TPMI}$ or $N_{TPMI,BP}$ required for actual transmission of the PUCCH or the PUSCH according to the second method, the payload of the DCI (or the DCI set) is changed, and thus there a risk of an increase in the complexity of DCI blind decoding of the terminal. Accordingly, this example can be applied when $N_{TPMI}$ or $N_{TPMI,BP}$, required for actual transmission of the PUCCH or the PUSCH, is semi-statically changed. However, it has an advantage of preventing waste in a DCI payload attributable to redundant bits.

In the embodiments, the PRB bundling size can be defined in units of PRBs (or the PRB bundling size may be evenly identified in units of PRBs), but may be defined on the basis of the RBG (or the PRB bundling size may be evenly identified in units of RBGs). If the PRB bundling size is defined on the basis of the RBG, the determined PRB bundling size may include a different number of PRBs according to the circumstances.

Figure 12:
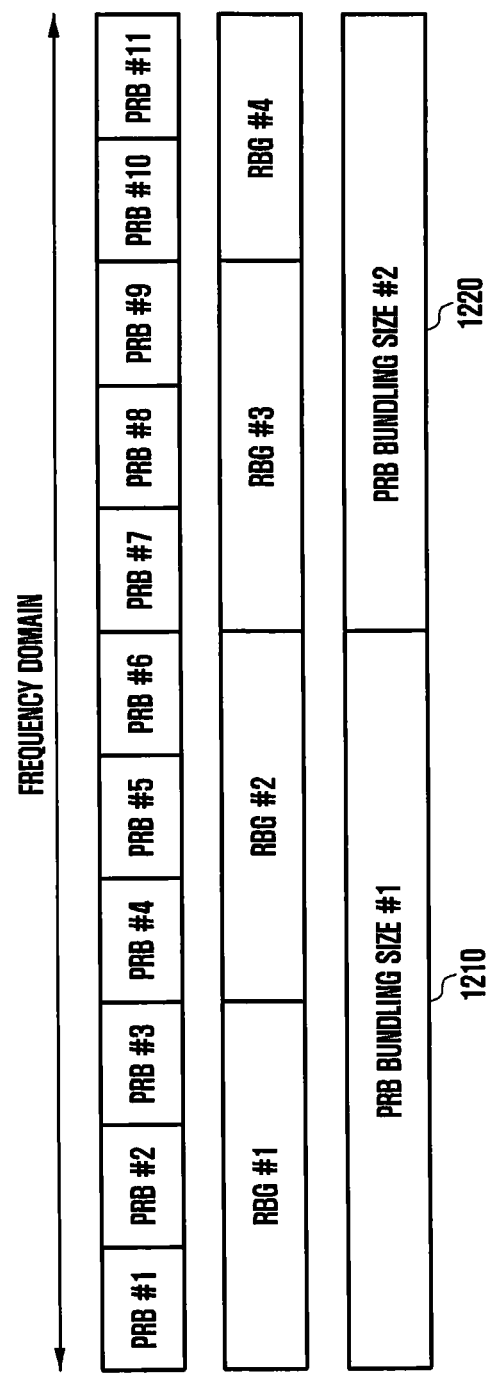
FIG. 12 illustrates an example of definition of the PRB bundling size according to an embodiment of the disclosure.

FIG. 12 illustrates a detailed example of definition of the PRB bundling size for the embodiments. In examples of evenly dividing the PRB and the RBG among the embodiments, if the total number of PRBs allocated to the terminal is not evenly divided by the PRB bundling size, a specific RBG or a specific PRB bundling group may include a number of PRBs smaller or larger than another RBG or PRB bundling group. For example, if the terminal receives four RBGs including eleven PRBs as illustrated in FIG. 12, PRB bundling size #1 1210, including RBG #1 and RBG #2, includes six PRBs, but PRB bundling size #2 1220, including RBG #3 and RBG #4, includes only five PRBs.

Figure 13:
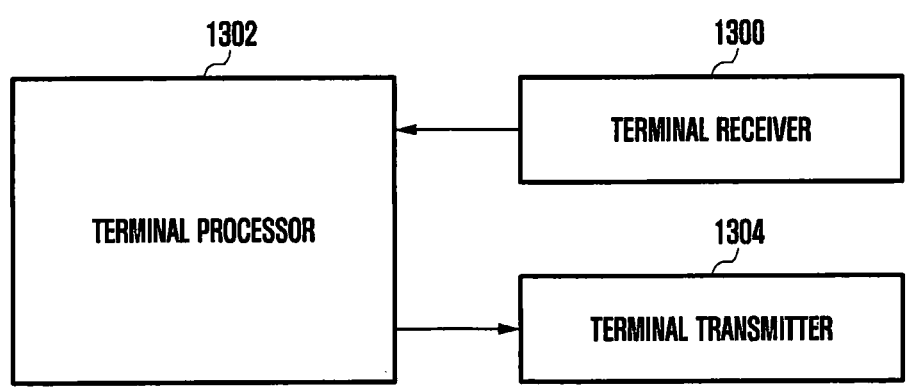
FIG. 13 is a block diagram illustrating the structure of a terminal according to an embodiment of the disclosure.
Figure 14:
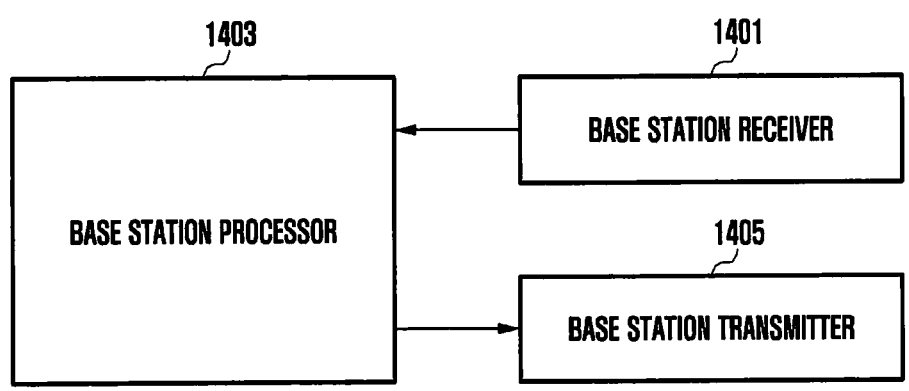
FIG. 14 is a block diagram illustrating the structure of a base station according to an embodiment of the disclosure.

Transmitters, receivers, and processors of the terminal and the base station for implementing embodiments of the disclosure are illustrated in FIGS. 13 and 14.

Specifically, FIG. 13 is a block diagram illustrating the internal configuration of a terminal according to an embodiment of the disclosure. As illustrated in FIG. 13, the terminal of the disclosure may include a terminal receiver 1300, a terminal transmitter 1304, and a terminal processor 1302. The terminal receiver 1300 and the terminal transmitter 1304 may be collectively referred to as a transceiver in embodiments of the disclosure. The transceiver may transmit and receive a signal to/from a base station. The signal may include control information and data. To this end, the transceiver includes an RF transmitter that up-converts and amplifies the frequency of a transmitted signal, an RF receiver that low-noise amplifies a received signal and down-converts the frequency, and the like. Further, the transceiver may receive a signal through a radio channel, output the signal to the terminal processor 1302, and transmit the signal output from the terminal processor 1302 via the radio channel. The terminal processor 1302 may control a series of processes such that the terminal operates according to the above-described embodiments of the disclosure. For example, the terminal receiver 1300 may receive a signal including one or more pieces of uplink TPMI information from the base station, and the terminal processor 1302 may perform control to analyze one or more pieces of uplink TPMI information. Thereafter, the terminal transmitter 1304 applies the one or more pieces of uplink TPMI and transmits uplink data or control information.

FIG. 14 is a block diagram illustrating the internal configuration of a base station according to an embodiment of the disclosure. As illustrated in FIG. 14, the base station of the disclosure may include a base station receiver 1401, a base station transmitter 1405, and a base station processor 1403. The base station receiver 1401 and the base station transmitter 1405 are collectively referred to as a transceiver in embodiments of the disclosure. The transceiver may transmit and receive a signal to/from the terminal. The signal may include control information and data. To this end, the transceiver includes an RF transmitter that up-converts and amplifies the frequency of a transmitted signal, an RF receiver that low-noise amplifies a received signal and down-converts the frequency, and the like. Further, the transceiver may receive a signal through a radio channel, output the signal to the base station processor 1403, and transmit the signal output from the base station processor 1403 via the radio channel. The base station processor 1403 may control a series of processes such that the base station operates according to the above-described embodiments of the disclosure. For example, the base station processor 1403 may perform control to determine one or more pieces of uplink TPMI information and generate downlink control information (DCI) including reference signal processing information for uplink precoding. Thereafter, the base station transmitter 1405 transfers the one or more pieces of uplink TPMI information to the terminal, and the base station receiver 1401 receives uplink data or control information to which the one or more pieces of uplink TPMI are applied.

Meanwhile, the embodiments of the disclosure disclosed in the specification and the drawings have been presented to easily explain technical contents of the disclosure and help comprehension of the disclosure, and do not limit the scope of the disclosure. That is, it is obvious to those skilled in the art to which the disclosure belongs that different modifications can be achieved based on the technical spirit of the disclosure. Further, if necessary, the above respective embodiments may be employed in combination. For example, first and second embodiments of the disclosure may be partially combined to operate a base station and a terminal. Further, although the above embodiments have been described on the basis of the FDD LTE system, it may also be possible to implement other variant embodiments on the basis of the technical idea of the embodiments in other systems such as 5G and NR systems.

Although exemplary embodiments of the disclosure have been shown and described in this specification and the drawings, they are used in general sense in order to easily explain technical contents of the disclosure, and to help comprehension of the disclosure, and are not intended to limit the scope of the disclosure. It is obvious to those skilled in the art to which the disclosure pertains that other modified embodiments on the basis of the spirits of the disclosure besides the embodiments disclosed herein can be carried out.

The inventionn claimed is:

1. A method of receiving an uplink signal by a base station in a communication system, the method comprising:
   generating downlink control information (DCI) including at least one uplink precoding information;
   transmitting the DCI to a terminal; and
   receiving an uplink signal generated based on the at least one uplink precoding information,
   wherein each of the at least one uplink precoding information is applied to each of at least one subband constituting resources for the uplink signal, and
   wherein, in case that a number of the at least one uplink precoding information included in the DCI is smaller than a maximum number of the uplink precoding information, the DCI includes a number of predetermined bits corresponding to a number obtained by subtracting the number of the at least one uplink precoding information from the maximum number of the uplink precoding information.

2. The method of claim 1, wherein the at least one subband is determined based on a size of a resource block group (RBG).

3. The method of claim 1, wherein the maximum number of the uplink precoding information is determined based on a size of a bandwidth part.

4. A method of transmitting an uplink signal by a terminal in a communication system, the method comprising:
receiving downlink control information (DCI) including at least one uplink precoding information from a base station; and
transmitting an uplink signal generated based on the at least one uplink precoding information,
wherein each of the at least one uplink precoding information is applied to each of at least one subband constituting resources for the uplink signal, and
wherein, in case that a number of the at least one uplink precoding information included in the DCI is smaller than a maximum number of the uplink precoding information, the DCI includes a number of predetermined bits corresponding to a number obtained by subtracting the number of the at least one uplink precoding information from the maximum number of the uplink precoding information.

5. The method of claim 4, wherein the at least one subband is determined based on a size of a resource block group (RBG).

6. The method of claim 4, wherein the maximum number of the uplink precoding information is determined based on a size of a bandwidth part.

7. A base station receiving an uplink signal in a communication system, the base station comprising:
a transceiver; and
a controller configured to perform control to generate downlink control information (DCI) including at least one uplink precoding information, transmit the DCI to a terminal, and receive an uplink signal generated based on the at least one uplink precoding information, and connected to the transceiver,
wherein each of the at least one uplink precoding information is applied to each of at least one subband constituting resource for the uplink signal, and
wherein, in case that a number of the at least one uplink precoding information included in the DCI is smaller than a maximum number of the uplink precoding information, the DCI includes a number of predetermined bits corresponding to a number obtained by subtracting the number of the at least one uplink precoding information from the maximum number of the uplink precoding information.

8. The base station of claim 7, wherein the at least one subband is determined based on a size of a resource block group (RBG).

9. The base station of claim 7, wherein the maximum number of the uplink precoding information is determined based on a size of a bandwidth part.

10. A terminal transmitting an uplink signal in a communication system, the terminal comprising:
a transceiver; and
a controller configured to perform control to receive downlink control information (DCI) including at least one uplink precoding information from a base station and transmit an uplink signal generated based on the at least one uplink precoding information, and connected to the transceiver,
wherein each of the at least one uplink precoding information is applied to each of at least one subband constituting resources for the uplink signal, and
wherein, in case that a number of the at least one uplink precoding information included in the DCI is smaller than a maximum number of the uplink precoding information, the DCI includes a number of predetermined bits corresponding to a number obtained by subtracting the number of the at least one uplink precoding information from the maximum number of the uplink precoding information.

11. The terminal of claim 10, wherein the at least one subband is determined based on a size of a resource block group (RBG).

12. The terminal of claim 10, wherein the maximum number of the uplink precoding information is determined based on a size of a bandwidth part.

* * * * *